US009652930B2

(12) United States Patent
Macbeth et al.

(10) Patent No.: US 9,652,930 B2
(45) **Date of Patent: *May 16, 2017**

(54) SYSTEMS, METHODS, AND APPARATUS FOR A BINGO GAME HAVING SPECIAL BALL FUNCTIONS

(71) Applicant: Gamesys Ltd., London (GB)

(72) Inventors: Mary Louise Macbeth, Ramsgate (GB); Mary Brittney Bean, London (GB); Thomas Newton, London (GB); Hans Elias, St. Albans (GB); Adam Scott, Addlestone (GB); Romina Thirunamam, London (GB); Stefan Hodgson, London (GB)

(73) Assignee: Gamesys Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,552

(22) Filed: Jul. 5, 2016

(65) Prior Publication Data

US 2016/0314650 A1 Oct. 27, 2016

Related U.S. Application Data

(63) Continuation of application No. 14/215,486, filed on Mar. 17, 2014, now Pat. No. 9,401,074.

(60) Provisional application No. 61/801,912, filed on Mar. 15, 2013, provisional application No. 61/907,202, filed on Nov. 21, 2013.

(51) Int. Cl.
*A63F 13/00* (2014.01)
*G07F 17/32* (2006.01)

(52) U.S. Cl.
CPC ........ *G07F 17/3225* (2013.01); *G07F 17/329* (2013.01); *G07F 17/3267* (2013.01)

(58) Field of Classification Search
None
See application file for complete search history.

(56) References Cited

U.S. PATENT DOCUMENTS

| | | | |
|---|---|---|---|
| 4,775,157 | A | 10/1988 | Armstrong |
| 4,863,173 | A | 9/1989 | Chen |
| 6,565,091 | B2 | 5/2003 | Weingardt |
| 6,581,935 | B1 | 6/2003 | Odom |

(Continued)

FOREIGN PATENT DOCUMENTS

| | | |
|---|---|---|
| AU | 2004229113 | 6/2006 |
| JP | 2003236035 | 8/2003 |

(Continued)

OTHER PUBLICATIONS

Office Action for U.S. Appl. No. 14/215,486 dated Jun. 10, 2015; 14 pages.

(Continued)

*Primary Examiner* — Jason Yen
(74) *Attorney, Agent, or Firm* — Michael D. Downs; Fincham Downs LLC

(57) ABSTRACT

Systems, apparatus, methods and articles of manufacture provide for a bingo game including at least one special ball having an associated special function. In one embodiment, one or more special functions may have persistent effects on one or more bingo spaces (e.g., of a bingo card) and/or may be combined with the effects one or more other special functions.

20 Claims, 21 Drawing Sheets

(56) References Cited

U.S. PATENT DOCUMENTS

| | | | | |
|---|---|---|---|---|
| 7,566,058 | B1 | 7/2009 | Itkis | |
| 7,874,907 | B2 | 1/2011 | Lozano et al. | |
| 7,892,085 | B2 | 2/2011 | Harris | |
| 8,167,706 | B2 | 5/2012 | Lind et al. | |
| 8,387,985 | B1 | 3/2013 | Itkis et al. | |
| 2002/0177478 | A1* | 11/2002 | Glasson | G07F 17/32 463/19 |
| 2003/0203750 | A1 | 10/2003 | Falciglia | |
| 2004/0178579 | A1 | 9/2004 | Lowell et al. | |
| 2004/0214631 | A1 | 10/2004 | Devaull | |
| 2004/0259622 | A1* | 12/2004 | Duhamel | G07F 17/32 463/16 |
| 2006/0035700 | A1 | 2/2006 | Van Asdale | |
| 2007/0142108 | A1* | 6/2007 | Linard | A63F 9/18 463/22 |
| 2008/0076510 | A1* | 3/2008 | Ito | G07F 17/32 463/17 |
| 2008/0254854 | A1 | 10/2008 | Slomiany et al. | |
| 2009/0075713 | A1 | 3/2009 | Hartman | |
| 2009/0075714 | A1* | 3/2009 | Meyer | G07F 17/32 463/19 |
| 2009/0075715 | A1 | 3/2009 | Coleman et al. | |
| 2010/0167804 | A1 | 7/2010 | Okuaki et al. | |
| 2011/0009180 | A1 | 1/2011 | Luciano | |
| 2011/0287823 | A1 | 11/2011 | Guinn et al. | |
| 2012/0046097 | A1 | 2/2012 | Nguyen et al. | |
| 2012/0172105 | A1 | 7/2012 | Huynh | |
| 2012/0214580 | A1 | 8/2012 | Hoffman et al. | |
| 2012/0231868 | A1 | 9/2012 | Guinn | |
| 2013/0130767 | A1 | 5/2013 | Falciglia | |
| 2014/0248935 | A1* | 9/2014 | Williams | A63F 3/062 463/19 |

FOREIGN PATENT DOCUMENTS

| | | |
|---|---|---|
| WO | WO2005046820 | 5/2005 |
| WO | WO2006098856 | 9/2006 |
| WO | WO2006113066 | 10/2006 |

OTHER PUBLICATIONS

Final Office Action for U.S. Appl. No. 14/215,486 dated Feb. 19, 2015; 18 pages.

Notice of Allowance for U.S. Appl. No. 14/215,486 dated Jun. 7, 2016; 13 pps.

* cited by examiner

SYSTEMS, METHODS, AND APPARATUS FOR A BINGO GAME HAVING SPECIAL BALL FUNCTIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

The present application claims the benefit of priority of each of the following applications:

U.S. Provisional Patent Application No. 61/801,912 filed Mar. 15, 2013, entitled "Systems and Methods for a Bingo Game having Special Ball Functions"; and U.S. Provisional Patent Application No. 61/907,202 filed Nov. 21, 2013, entitled "Systems and Methods for a Bingo Game having Special Ball Functions."

Each of the above-referenced applications is incorporated by reference in its entirety in the present application.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
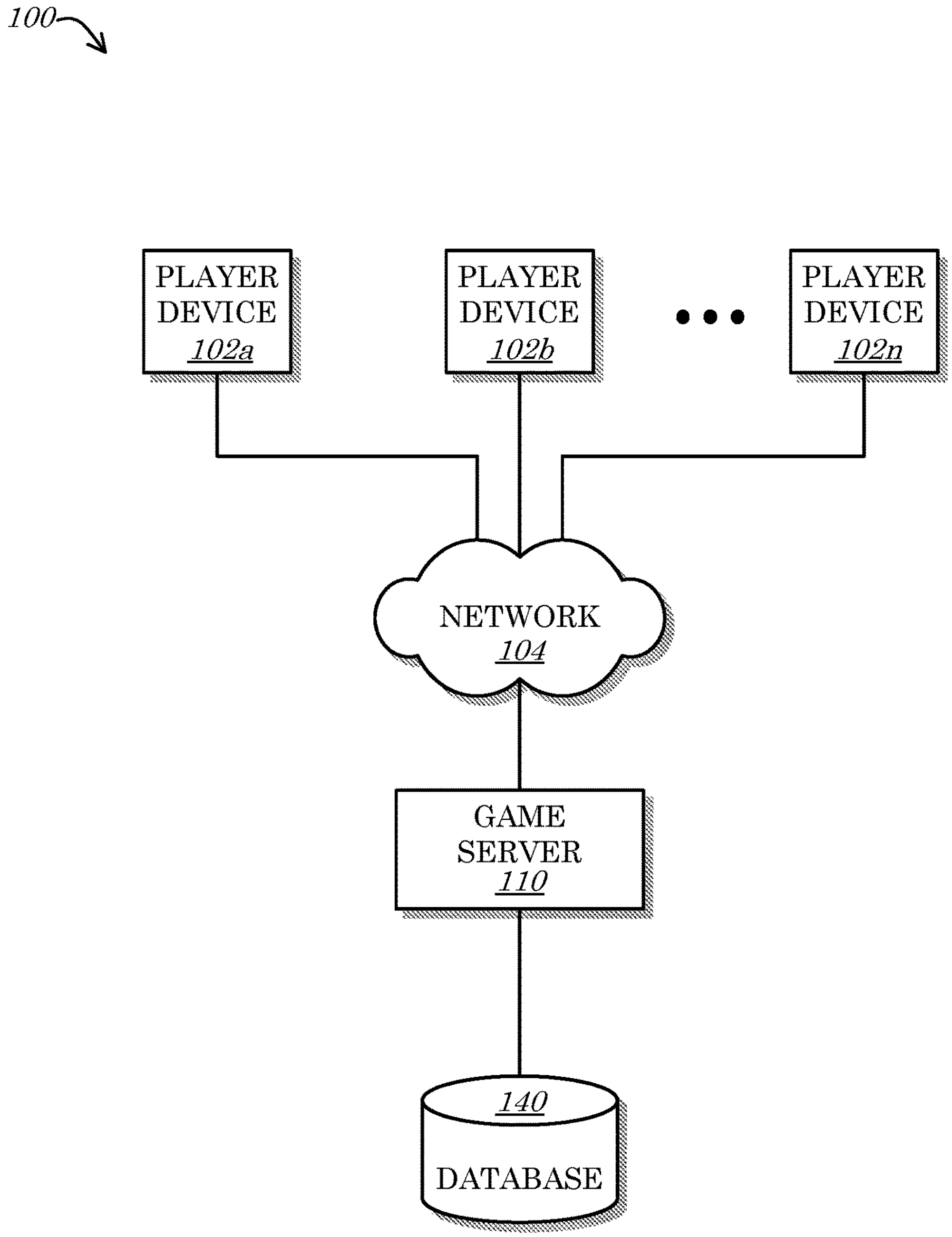
FIG. 1 is a block diagram of a system according to one or more embodiments.

Inventors have recognized that, in accordance with some embodiments described in this disclosure, some types of game providers and some types of social network users, players, and/or other users, may find it beneficial to provide and/or to participate in a bingo game that provides for bingo balls (and/or other types of bingo game symbols) having one or more special associated functions.

In accordance with some exemplary and non-limiting embodiments, this disclosure describes, among other things, systems, and methods for providing, facilitating and/or playing bingo games, such as 75-ball bingo games (e.g., played on a 5×5 card). Also, it will be understood that computer readable media (and apparatus comprising such computer readable media) may be configured so as to provide for one or more of the functions described in this disclosure.

Some introductory examples of one or more embodiments are described in this disclosure. The embodiments described in this disclosure are not limited to any such examples. Within each broader example, one or more additional, alternative, and/or optional examples of some features may be referenced, and not all such features or examples may be required.

In accordance with some embodiments of the present invention, one or more systems, apparatus, methods, articles of manufacture, and/or computer readable media (e.g., a non-transitory computer readable memory storing instructions for directing a processor) provide for one or more of: (i) determining a special ball for a bingo game, the special ball being associated with at least one special function; (ii) determining a trigger associated with a special ball for activating a special function; (iii) activating a special function associated with a special ball; (iv) modifying a bingo game interface based on a special function of a special ball; (v) daubing and/or undaubing at least one bingo space for a bingo game based on a special function of a special ball; and/or (vi) changing a state of at least one bingo space for a bingo game based on a special function of a special ball.

According to some embodiments, a bingo game is provided that utilizes one or more bingo balls (and/or other representations of bingo game symbols) associated with one or more special functions. For discussion purposes, some non-limiting examples of bingo game symbols associated with special functions may be referred in this disclosure as "special balls" and/or "Wonderballs."

In one or more embodiments, a special ball may be associated with one or more actions or functions (which may be referred to in this disclosure as "special actions" or "special functions"). In accordance with one or more embodiments, special functions may be activated, taken, initiated or implemented, for example, when a special ball is called and/or enabled for play, and/or when a bingo space associated with the special ball is marked or daubed. In some embodiments, a special ball may be associated with a special function and a trigger or condition that, when met, causes a bingo game to activate or provide the special function.

According to some embodiments, an implementation of a special function may comprise animation, audio and/or audio, via a user interface, to represent an effect of the special function (e.g., an animated representation of a bingo ball or character may daub and/or undaub one or more bingo spaces).

In some embodiments, one or more special balls may be dispersed (e.g., randomly and/or by design) within standard ball calls.

In some embodiments, one or more special balls may be represented in a visible ball queue of balls not yet enabled for play (e.g., displayed in a visible queue with one or more other special and/or standard balls), so players can see an indication of one or more balls that may be called, before they are called. Some examples of bingo ball queues and associated features that may be useful, in accordance with some embodiments discussed in this disclosure, are discussed in U.S. patent application Ser. No. 14/215,132 (Attorney Docket No. GS01-003-02), entitled "SYSTEMS, METHODS, AND APPARATUS FOR BINGO GAMES HAVING A VISIBLE BALL QUEUE," filed Mar. 17, 2014, which is incorporated by reference in its entirety in this disclosure.

According to some embodiments, an action associated with a special ball may benefit one or more players and/or may hinder the chances of one or more players to achieve a bingo (e.g., to achieve a winning bingo configuration).

In accordance with some embodiments of the present invention, one or more systems, apparatus, methods, articles of manufacture, and/or computer readable media provide for one or more of: (i) calling a first special ball for play in a bingo game; (ii) applying a function of the first special ball to a bingo space for the bingo game (e.g., to provide a persistent effect on the bingo space); (iii) calling a second special ball for play in the bingo game; and (iv) applying the function of the second special ball to the bingo space for the bingo game.

In some embodiments, applying the respective functions of first one special ball and then a second, later special ball results in a combined effect of both special functions (e.g., on one or more bingo spaces). In some embodiments, applying a second special function to a bingo space after a first special function has been applied to the bingo space may comprise preventing an effect of the second special function (e.g., the first special function renders the bingo space immune to the second special function).

In accordance with some embodiments of the present invention, one or more systems, apparatus, methods, articles of manufacture, and/or computer readable media provide for one or more of: (i) determining a first state of a bingo space of a player (and/or of a corresponding player bingo symbol); (ii) determining a second state of the bingo space (e.g., based on a first called bingo game symbol); (iii) determining one or more functions to apply to the bingo space (e.g., based on a called bingo game symbol associated with a special function); (iv) determining a third state of the bingo space (e.g., based on a second called bingo game symbol and/or an associated second special function); and/or (v) determining a game result for a bingo game based on the third state of the bingo space.

In some embodiments, one or more types of special balls may be available in any bingo game available on a bingo gaming platform or website. For example, a global special ball may be available in any bingo room, bingo game theme, or bingo game available within an on-line bingo application or gaming platform. In some embodiments, one or more types of special balls may be limited to only specific themes, game rooms and/or games. For example, a theme-specific special ball may be specific to a single bingo game theme within an on-line bingo application and/or may only appear in an associated bingo room (with the exception of promotions, according to some embodiments).

In accordance with one or more example and non-limiting embodiments, this disclosure describes, among other things, systems, apparatus, articles of manufacture, and methods for providing, facilitating and/or playing bingo games, such as a bingo game played on a bingo card (e.g., a 5×5 bingo card). Also, it will be understood that computer readable media (and apparatus comprising such computer readable media) may be configured so as to provide for one or more of the functions described in this disclosure. In accordance with some embodiments, at least one function or step of a described process may be performed via a user interface (e.g., presented via a display of a mobile device or other type of computing device).

A. Terms and Definitions

Throughout this description and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

A "game", as the term is used in this disclosure (unless specified otherwise), may generally comprise any game (e.g., wagering or non-wagering, electronically playable over a network) playable by one or more players in accordance with specified rules. A game may be playable on a personal computer (PC) online in web browsers, on a game console and/or on a mobile device such as a smart-phone or tablet computer. "Gaming" thus generally refers to play of a game.

A "casual game", as the term is utilized in this disclosure (unless otherwise specified), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used in this disclosure (unless specified otherwise), generally refers to (and in specific embodiments may be expressly limited to) a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but may also be implemented on other platforms such as mobile devices.

A "wagering game", as the term is used in this disclosure (unless specified otherwise), may generally comprise (and in specific embodiments may be expressly limited to) a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used in this disclosure (unless specified otherwise), generally refers to (and in specific embodiments may be expressly limited to) an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized in this disclosure, the term "player" may generally refer to (and in specific embodiments may be expressly limited to) any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described in this disclosure are associated with a "player device" or a "network device". As used in this disclosure, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used in this disclosure, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used in this disclosure (unless specified otherwise), may generally refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used in this disclosure (unless indicated otherwise), may generally comprise (and in specific embodiments may be expressly limited to) a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used in this disclosure, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described in this disclosure encompass awards, prizes and payouts which are monetary, non-monetary, tangible or intangible.

As used in this disclosure, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used in this disclosure (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

Some embodiments are descriptive of an "array" or "matrix" of symbols or game outcomes. As utilized in this disclosure, the terms "array" and "matrix" generally refer to a group of symbols, numbers, and/or expressions arranged in a plurality of rows and columns (or that can be readily and appropriately represented mathematically as being so arranged). In some embodiments, the term "array" is utilized to refer to a multi-dimensional matrix or combination of matrices while the term "matrix" is utilized to refer to a two-dimensional set of symbols or numbers (e.g., bingo tickets, slot reel symbols and/or mathematical representations thereof). According to some embodiments, such as in the case that an array and/or matrix is populated with graphical game symbols, the array or matrix may be output and/or displayed (e.g., transmit to and/or rendered on a player device) as part of a game session.

Some embodiments of this disclosure relate to bingo games and/or computer software applications for providing bingo games. Some embodiments of this disclosure relate to gaming networks for providing bingo games, including social network games, single player games and/or multiplayer games.

According to some embodiments, a bingo game is provided in which a player uses one or more cards (or tickets, or other type of physical or electronic game play area or game space) that include symbols (e.g., alphanumeric characters and/or other types of identifiers) assigned to respective spaces or other designated areas on the card. One or more symbols are drawn, selected, or otherwise determined from a set of symbols available for the bingo game, and, in accordance with some embodiments, the drawn symbols are compared to the symbols designated on the card to see if there are any matches. It will be readily understood that a set of symbols for a bingo game may include any range of numbers, multiple ranges of numbers, a non-sequential range of numbers, alphanumeric characters, non-numeric symbols, letters, punctuation marks, and/or any other representation of information.

According to some embodiments, for a given bingo game, the distribution of bingo symbols across cards, and/or the distribution of the tickets across players, may be in accordance with one or more distribution algorithms and/or at random. In some embodiments, a bingo system generates all possible combinations of available bingo symbols as cards, and distributes all of the possible cards before distributing any repeat cards.

According to some embodiments, if marked (or "daubed") spaces on a card form one or more previously designated arrangements (a "bingo pattern" or "winning pattern"), the card may be deemed a winning card and/or the player may be eligible for a prize. In one example, a player may win a prize by calling "Bingo" for a card with a winning pattern (e.g., by clicking a "Bingo" button of a game interface to indicate the player thinks his electronic bingo card includes a winning bingo pattern). "Daubed" or "marked" will be used synonymously in this disclosure to refer to spaces, symbols, numbers, etc., on a card that have been marked, covered, stamped, daubed, highlighted, or otherwise identified physically, visually, and/or graphically, as potentially contributing to a winning pattern (e.g., alone or in combination with one or more other marked spaces). In some embodiments, spaces are daubed (e.g., automatically by a gaming device and/or manually by a player) if they match symbols drawn for a bingo game. Alternatively, or in addition, one or more spaces may be daubed without requiring that the space match a drawn symbol (a "free" daub or mark). For example, a card may have one or more free daubs automatically prior to the start of play (e.g., the center square of a 5×5 grid may be pre-marked with a free daub) and/or anytime during play (e.g., by receiving a free random daub in accordance with a game rule).

According to one embodiment, a card includes spaces arranged in columns and rows (e.g., a 5×5 grid of spaces, a 3×4 array of ticket lines), each having a designated number (e.g., selected from a set of bingo numbers 1-75) represented in a respective space on the card.

According to some embodiments, one or more symbols for a bingo game may be associated with a symbol identifier that identifies the symbol (e.g., a unique bingo number) and with one or more types of symbol category identifiers that identify a category, group, and/or type associated with a symbol.

In accordance with one or more embodiments, a symbol category identifier may comprise a location identifier and/or a number category or group. According to some embodiments, each symbol for a bingo game may be associated with one or more respective location identifiers. In one embodiment, certain symbols may be designated only in certain areas of a game card. For example, the "B" column of a 5×5 card may only include numbers selected in the range of 1-15. In another example, the first column of a 90 ball bingo game ticket may only include numbers selected in the range of 1-10, the second column may only include numbers selected in the range of 11-20, and so on.

Accordingly, in some embodiments, a given bingo symbol may be associated with both a number (or a shape, color, or other type of symbol identifier that distinguishes it from other symbols) and location information (e.g., a column identifier, row identifier, and/or other type of location identifier) including information about where the symbol may appear on the card. In one example, a bingo ball may be associated with the number "3" and with a "B", indicating that if it appears on a card it would appear in a designated "B" column of spaces.

According to one embodiment, a card for a bingo game may include one or more types of location identifiers. Location identifiers may include, without limitation, one or more column identifiers, row identifiers, and/or other types of identifiers that uniquely identify a particular grid space, row, column, area, or other portion of a bingo card. For example, each column of a 5×5 bingo card may be identified respectively as “B”, “I”, “N”, “G”, or “O”.

According to some embodiments, symbols may be represented (e.g., physically or electronically via a user interface) as numbered balls. Drawn numbers themselves may be referred to in this disclosure as “balls” for illustrative purposes and without limitation. As used in this disclosure, a “symbol draw” or “ball draw” may be used to refer to a process for selecting or otherwise determining (e.g., at random) numbers or other types of symbols drawn for use in comparing to symbols on a card for a bingo game. “Drawn balls” and “drawn numbers” may be used for convenience to refer to symbols selected in a symbol draw, and it will be understood that such terms are not limited to balls or numbers, but encompass any type of symbols drawn for a bingo game. Those of skill in the art will realize that the symbols used in an electronic bingo game may be displayed in any convenient fashion as deemed appropriate for a particular implementation, and that a simulated ball draw is merely one example. The number of balls drawn and the timing of ball draws may vary according to the desired type of bingo game.

According to some embodiments, a bingo game is played until at least one predetermined winning pattern is established on a bingo card. In some embodiments, determining whether a winning pattern is marked properly on a card may comprise determining whether each marked space may be compared to a set of drawn symbols to verify that it is a valid mark and therefore may qualify for or contribute to a winning pattern. In another example, determining if a marked pattern is a winning pattern may comprise determining whether any marked spaces are valid free daubs. According to some embodiments, a bingo game is played until a predetermined number of winning patterns are achieved (e.g., by one or more players) and/or until a time limit expires.

According to some embodiments, a player must identify any matches between drawn numbers and numbers designated on the player’s card(s), the player must take action to daub spaces on the card (e.g., via a user interface) in order to form potential winning patterns, and/or the player must take action to declare a card has one or more winning patterns (e.g., by clicking a “Bingo” button). In one embodiment, one or more daubed spaces may be undaubed by a player and/or bingo game program. In one example, a player may undaub a space that the player mistakenly daubed. In some embodiments, one or more matching numbers may be daubed automatically and/or one or more winning patterns of marked spaces may be identified automatically (e.g., electronically by gaming device in accordance with instructions of a computer software program). Some embodiments may provide for automatic daubing of one or more spaces (e.g., for initial free daubs and/or random free daubs during play) and for manual daubing by the player of one or more spaces (e.g., in response to matching drawn numbers).

B. General Systems and Structures

Turning first to FIG. 1, a block diagram of a system 100 according to some embodiments is shown. In some embodiments, the system 100 may comprise a gaming platform such as a gaming platform via which one or more multiplayer and/or online games may be played (e.g., one or more bingo games as described in this disclosure). In some embodiments, the system 100 may comprise a plurality of player devices 102*a-n* in communication with and/or via a network 104. In some embodiments, a game server 110 may be in communication with the network 104 and/or one or more of the player devices 102*a-n*. In some embodiments, the game server 110 (and/or the player devices 102*a-n*) may be in communication with a database 140. The database 140 may store, for example, game data (e.g., processed and/or defined by the game server 110), data associated with players (not explicitly shown) owning and/or operating the player devices 102*a-n*, and/or instructions that cause various devices (e.g., the game server 110 and/or the player devices 102*a-n*) to operate in accordance with embodiments described in this disclosure.

According to some embodiments, any or all of the components 102*a-n*, 104, 110, 140 of the system 100 may be similar in configuration and/or functionality to any similarly named and/or numbered components described in this disclosure. Fewer or more components 102*a-n*, 104, 110, 140 (and/or portions thereof) and/or various configurations of the components 102*a-n*, 104, 110, 140 may be included in the system 100 without deviating from the scope of embodiments described in this disclosure. While multiple instances of some components 102*a-n* are depicted and while single instances of other components 104, 110, 140 are depicted, for example, any component 102*a-n*, 104, 110, 140 depicted in the system 100 may comprise a single device, a combination of devices and/or components 102*a-n*, 104, 110, 140, and/or a plurality of devices, as is or becomes desirable and/or practicable. Similarly, in some embodiments, one or more of the various components 102*a-n*, 104, 110, 140 may not be needed and/or desired in the system 100.

The player devices 102*a-n*, in some embodiments, may comprise any type or configuration of electronic, mobile electronic, and or other network and/or communication devices (or combinations thereof) that are or become known or practicable. A first player device 102*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102*a-n* may be specifically utilized and/or configured (e.g., via specially-programmed and/or stored instructions such as may define or comprise a software application) to communicate with the game server 110 (e.g., via the network 104). In some embodiments, a game server 110 may be in communication with a variety of different types of player devices 102*a-n*.

The network 104 may, according to some embodiments, comprise a LAN, WAN, cellular telephone network, Bluetooth® network, NFC network, and/or RF network with communication links between the player devices 102*a-n*, the game server 110, and/or the database 140. In some embodiments, the network 104 may comprise direct communications links between any or all of the components 102*a-n*, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102*b* may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 110, 140 of the system 100. The network 104 may comprise one or more cellular telephone networks with communication links between the player devices 102*a-n* and the game server 110, for example, and/or may comprise the Internet, with communication links between the player devices 102*a-n* and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games (e.g., one or more bingo games as described in this disclosure). In some embodiments, the gaming entity (and/or a third-party; not explicitly shown) may provide an interface (not shown in FIG. 1) to and/or via the player devices 102*a-n*. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may cause and/or facilitate various functionality and/or features of one or more bingo games, each as described in this disclosure.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102*a-n* may comprise the database 140 or a portion thereof, for example, and/or the game server 110 may comprise the database 140 or a portion thereof.

According to some embodiments, any or all of the player devices 102*a-n* in conjunction with one or more of the game server 110 and/or the database 140 (e.g., via the network 104) may conduct (in whole or in part), facilitate, and/or otherwise be associated with execution of one or more stored procedures, applications, processes, and/or methods (and/or one or more portions and/or combinations thereof) as described in this disclosure.

In some embodiments a game server 110 and/or one or more of the player devices 102*a-n* stores and/or has access to data useful for facilitating play of a game. For example, game server 110 and/or a player device 102*a-n* may store (i) one or more probability databases for determining one or more outcome(s) for a game, (ii) a current state or status of a game or game session, (iii) one or more user interfaces for use in a game, (iv) one or more game themes for a game and/or (v) profiles or other personal information associated with a player of a game. It should be noted that in some embodiments such data may be stored on the game server 110 and information based on such data may be output to a player device 102*a-n* during play of a game while in other embodiments a game program may be downloaded to a local memory of a player device 102*a-n* and thus such data may be stored on a player device 102*a-n* (e.g., in encrypted or other secure or tamper-resistant form).

According to some embodiments, a game server 110 may comprise a computing device for facilitating play of a game (e.g., by receiving an input from a player, determining an outcome for a game, causing an outcome of a game to be displayed on a player device, facilitating a wager and/or a provision of a payout for a game). For example, the game server 110 may comprise a server computer operated by a game provider or another entity (e.g., a social network website). In some embodiments, the game server may determine an outcome for a first aspect and/or second aspect of a game by requesting and receiving such an outcome from another remote server operable to provide such outcomes. In some embodiments, the game server 110 may further be operable to facilitate a game program for a game (e.g., a wagering game). In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, managing accounts, controlling games, etc.). In some embodiments, game server 110 may comprise two or more server computers operated by the same entity (e.g., one server being primarily for storing states of games in progress and another server being primarily for storing mechanisms for determining outcomes of games, such as a random number generator).

Examples of processes that may be performed by the game server 110 (directly or indirectly) may include, but are not limited to: (i) determining a set of available numbers and/or other types of bingo symbols for a bingo game; (ii) conducting a symbol draw or otherwise determining or selecting (e.g., at random) which symbols, of a plurality of bingo symbols available (e.g., depending on the type of bingo game), are drawn for a particular round of a bingo game; (iii) transmitting an indication of at least one drawn symbol to a player device; (iv) determining one or more drawn symbols that are in play for a bingo game (e.g., that previously may have been visible and/or queued but not yet available for play); (v) transmitting an indication of at least one drawn and queued symbol to a player device; (vi) determining and/or transmitting (e.g., to a player device) one or more cards, tickets, or other type of bingo game space for a bingo game; (vii) determining one or more players of a bingo game; (viii) determining and/or establishing at least one winning pattern for a bingo game; (ix) determining at least one bingo card having at least one valid winning pattern (e.g., of daubed spaces); (x) determining an outcome of a bingo game; (xi) transmitting an indication of an outcome of a bingo game to a player device; (xii) determining one or more drawn symbols that are queued to be enabled for play in a bingo game (e.g., but are not yet available for play); (xiii) determining one or more drawn symbols for which respective visual representations are (or are to be) made visible to one or more players; (xiv) authorizing a game program to be downloaded to a player device; and/or (xv) modifying (and/or directing a player device to modify) a game interface (e.g., to provide for electronic gaming).

A player device 102*a-n* may be used to play a wagering or non-wagering game (e.g., a social or casual game) over a network and output information relating to the game to players participating in the game (e.g., outcomes for a round of a bingo game, special numbers for a player, qualifying for a level upgrade in the game, balance of credits available for play of the game, etc.). Any and all information relevant to any of the aforementioned functions may be stored locally on one or more of the player devices 102*a-n* and/or may be accessed using one or more of the player devices 102*a-n* (in one embodiments such information being stored on, or provided via, the game server 110). In another embodiment, a player device 102*a-n* may store some or all of the program instructions for providing one or more of the functions described with respect to game server 110 (e.g., in a downloadable software application). In some embodiments, the game server 110 may be operable to authorize the one or more player devices 102*a-n* to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102*a-n* may be terminals for displaying to an associated player such outcomes and results and other graphics and data related to a game.

It should be noted that the one or more player devices 102*a-n* may each be located at the same location as at least one other player device 102*a-n* (e.g., such as in a casino or internet café) or remote from all other player devices 102*a-n*. Similarly, any given player device may be located at the same location as the game server 110 or may be remote from the game server 110. It should further be noted that while the game server 110 may be useful or used by any of the player devices 102*a-n* to perform certain functions described in this disclosure, the game server 110 need not control any of the player devices 102*a-n*. For example, in one embodiment the game server 110 may comprise a server hosting a website of an online casino accessed by one or more of the player devices 102*a-n*.

In one embodiment, a game server 110 may not be necessary or desirable. For example, some embodiments described in this disclosure may be practiced on one or more player devices 102*a-n* without a central authority. In such an embodiment, any functions described in this disclosure as performed by a game server 110 and/or data described as stored on a game server 110 may instead be performed by or stored on one or more player devices 102*a-n*. Additional ways of distributing information and program instructions among one or more player devices 102*a-n*, a game server 110 and/or another server device will be readily understood by one skilled in the art upon contemplation of the present disclosure.

Figure 2:
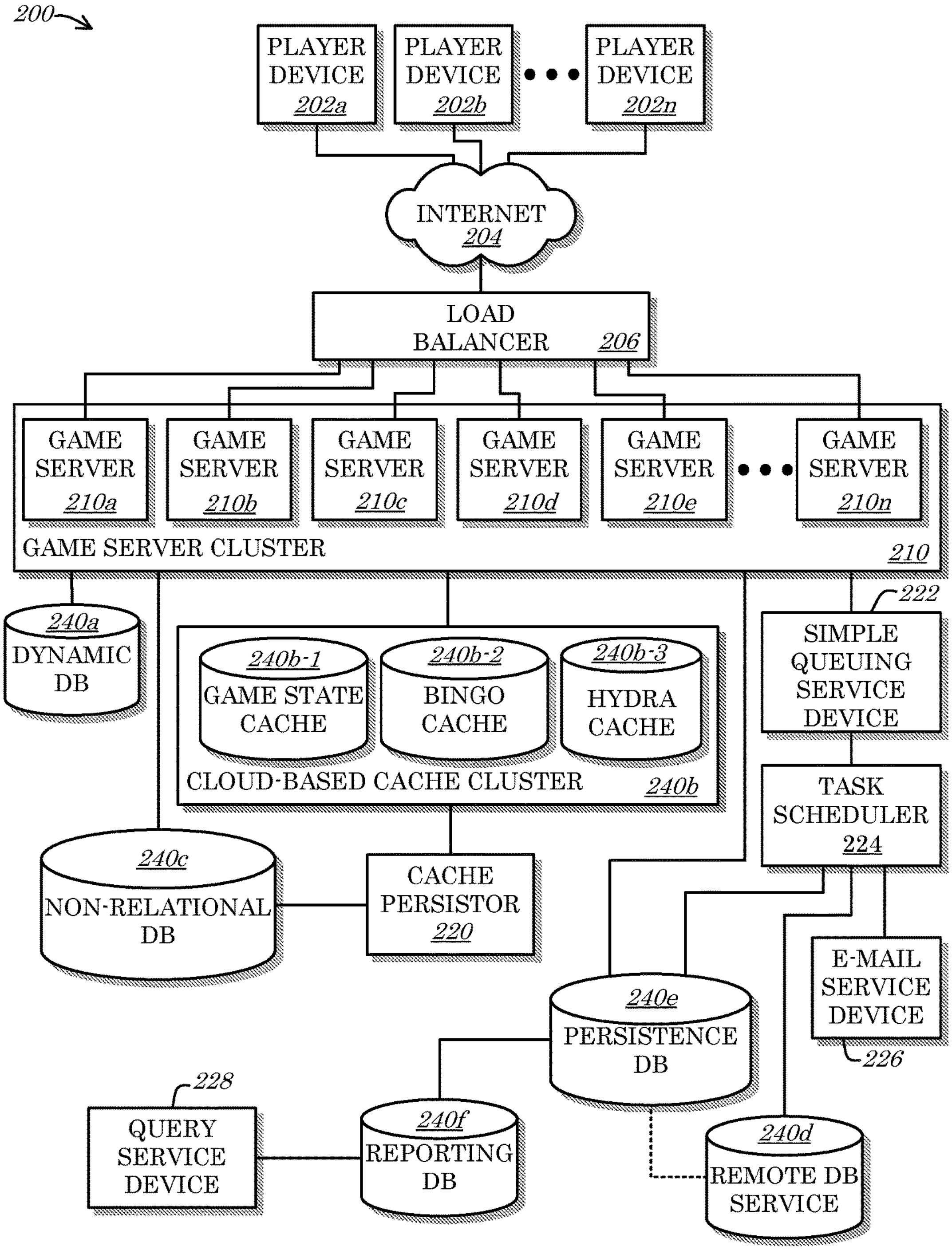
FIG. 2 is a block diagram of a system according to one or more embodiments.

Referring now to FIG. 2, a block diagram of a system 200 according to some embodiments is shown. In some embodiments, the system 200 may comprise a gaming platform such as a platform via which social, multiplayer, and/or online games may be played (e.g., one or more bingo games as described in this disclosure). In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic database (DB) 240*a*, a cloud-based cache cluster 240*b* (e.g., comprising a game state cache 240*b*-1, a bingo cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described in this disclosure. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described in this disclosure. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slot-style games, poker, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo game (or tournament), a second game server 210*c* may host a second particular session of an online bingo game (or tournament), a third game server 210*c* may facilitate an online poker tournament (e.g., and a corresponding plurality of game sessions that comprise the tournament), and/or a fourth game server 210*d* may provide an online slots game (e.g., by hosting one or more slot game sessions).

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer (not explicitly shown in FIG. 2). In some embodiments, communications between the player devices 202*a-n* and the game server cluster 210 may be conducted in accordance with the Hypertext Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202*a-n* such as by utilizing a broadcaster device (also not separately shown in FIG. 2) that transmits the time-released game results to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DyanmoDB™ service provided by Amazon® Web Services, LLC. The dynamic DB 240*a* may, for example, store information specific to one or more certain game types (e.g., bingo games) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1; bingo state data (e.g., the current state of spaces (marked or unmarked) of a player's bingo card, history of called balls, information about ball call order, etc.) may be stored in the bingo cache 240*b*-2; and/or other game and/or player information (e.g., progressive data, referral data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

According to some embodiments, any or all of the player devices 202*a-n* in conjunction with one or more of the game servers 210*a-n* and/or the databases 240*a-f* (e.g., via the network 204) may conduct (in whole or in part), facilitate, and/or otherwise be associated with execution of one or more stored procedures, applications, processes, and/or methods (and/or one or more portions and/or combinations thereof) as described in this disclosure.

Figure 3:
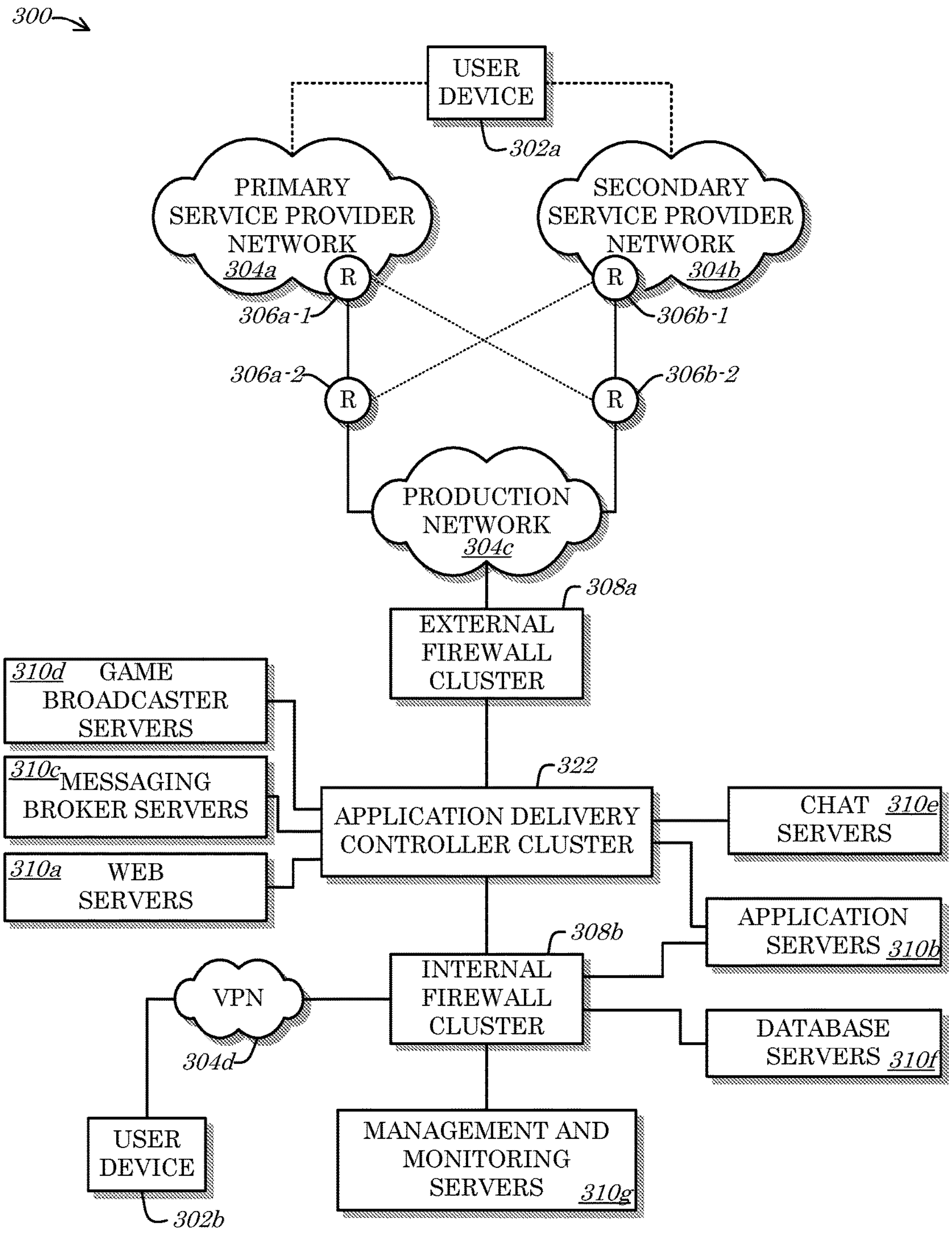
FIG. 3 is a block diagram of a system according to one or more embodiments.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played (e.g., one or more bingo games as described in this disclosure). In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described in this disclosure. Fewer or more components 302*a-b*, 304*a-b*, 306*a-b*, 308*a-b*, 310*a-g*, 322 (and/or portions thereof) and/or various configurations of the components 302*a-b*, 304*a-b*, 306*a-b*, 308*a-b*, 310*a-g*, 322 may be included in the system 300 without deviating from the scope of embodiments described in this disclosure. While multiple instances of some components 302*a-b*, 304*a-b*, 306*a-b*, 308*a-b*, 310*a-g* are depicted and while single instances of other components 322 are depicted, for example, any component 302*a-b*, 304*a-b*, 306*a-b*, 308*a-b*, 310*a-g*, 322 depicted in the system 300 may comprise a single device, a combination of devices and/or components 302*a-b*, 304*a-b*, 306*a-b*, 308*a-b*, 310*a-g*, 322, and/or a plurality of devices, as is or becomes desirable and/or practicable. Similarly, in some embodiments, one or more of the various components 302*a-b*, 304*a-b*, 306*a-b*, 308*a-b*, 310*a-g*, 322 may not be needed and/or desired in the system 300.

In some embodiments, a first user device 302*a* may comprise an electronic device owned and/or operated by a player of an online game (not explicitly shown) and/or by an entity that otherwise accesses online game content and/or services externally (e.g., requiring external login and/or access credentials and/or procedures). The first user device 302*a* may, for example, be utilized to access content provided by and/or via the application delivery controller cluster 322. In some embodiments, the first user device 302*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 302*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and/or commands from the first user device 302*a*. The first user device 302*a* may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 302*a* and one or more of the servers 310*a-g*. In the case that the first user device 302*a* is utilized to access an online gaming interface for example, one or more of the web servers 310*a* (e.g., that may provide graphical and/or rendering elements for an interface and/or other web services) and/or the application servers 310*b* (e.g., that may provide rule and/or logic-based programming routines, elements, and/or functions—e.g., game play engines) may be called and/or managed by the application delivery controller cluster 322.

In some embodiments, the messaging broker servers 310*c* may receive and/or retrieve messages from the first user device 302*a* (and/or from one or more of the other servers 310*a-b*, 310*d-g*) and perform one or more inter-application processes in relation thereto. The messaging broker servers 310*c* may, for example, route, transform, consolidate, aggregate, store, augment, and/or otherwise process one or more requests in connection with provision of online gaming services to the first user device 302*a* (e.g., facilitating a decoupling of services provided by various applications on and/or from the various servers 310*a-b*, 310*d-g*). According to some embodiments, the game broadcaster servers 310*d* may provide scheduled releases of information descriptive of an online game. The game broadcaster servers 310*d* may, for example, provide a broadcast feed of bingo numbers, slot and/or other random (and/or pseudo-random) number results that may be accessed by (and/or transmitted to) the first user device 302*a* (e.g., in connection with the play of an online bingo, slots, and/or other game for which broadcast information may be utilized). In some embodiments, the chat servers 310*e* may provide, manage, and/or facilitate communications between the first user device 302*a* (and/or first user thereof) and one or more other player/user devices (such as a second user device 302*b* and/or other player/user devices not shown in FIG. 3).

According to some embodiments, the second user device 302*b* may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 302*b* to interface with the privately-accessible VPN 304*d*. The VPN 304*d* may, for example, provide direct access to the application servers 310*b*, the database servers 310*f*, the management and monitoring servers 310*g*, and/or the application delivery controller cluster 322. In some embodiments (as depicted in FIG. 3), such access may be gated through and/or insulated or protected by an internal firewall cluster 308*b*. The second user device 302*b* may, for example, be required to provide credentials to and/or otherwise access the application delivery controller cluster 322 and/or servers 310*a-g* via the internal firewall cluster 308*b*.

In some embodiments, the database servers 310*f* may provide access to one or more databases and/or data stores (e.g., not shown in FIG. 3; for data storage and/or retrieval). In some embodiments, the management and monitoring servers 310*g* may provide services such as monitoring, reporting, troubleshooting, analysis, configuring, etc. to the second user device 302*b*. The second user device 302*b* may, for example, access the management and monitoring servers 310*g* and/or the database servers 310*f* to run reports descriptive of online gaming operations, game play, and/or game referral setup, management, and/or analysis. According to some embodiments, either or both of the user devices 302*a-b* in conjunction with one or more of the servers 310*a-g* and/or the application delivery controller cluster 322 may conduct (in whole or in part), facilitate, and/or otherwise be associated with execution of one or more stored procedures, applications, processes, and/or methods (and/or one or more portions and/or combinations thereof).

Utilization of the term "server" with respect to the servers 310*a-g* of the system 300 of FIG. 3 is meant solely to ease description of the configuration and/or functionality of the servers 310*a-g*. The term "server" is not intended to be limiting with respect to any particular hardware, software, firmware, and/or quantities thereof utilized to implement any or all of the servers 310*a-g* of the system 300. Similarly, while multiple types and/or instances of the servers 310*a-g* are depicted in FIG. 3, any or all of the servers 310*a-g* may be implemented in, on, and/or by one or multiple computer server and/or other electronic devices.

Figure 4:
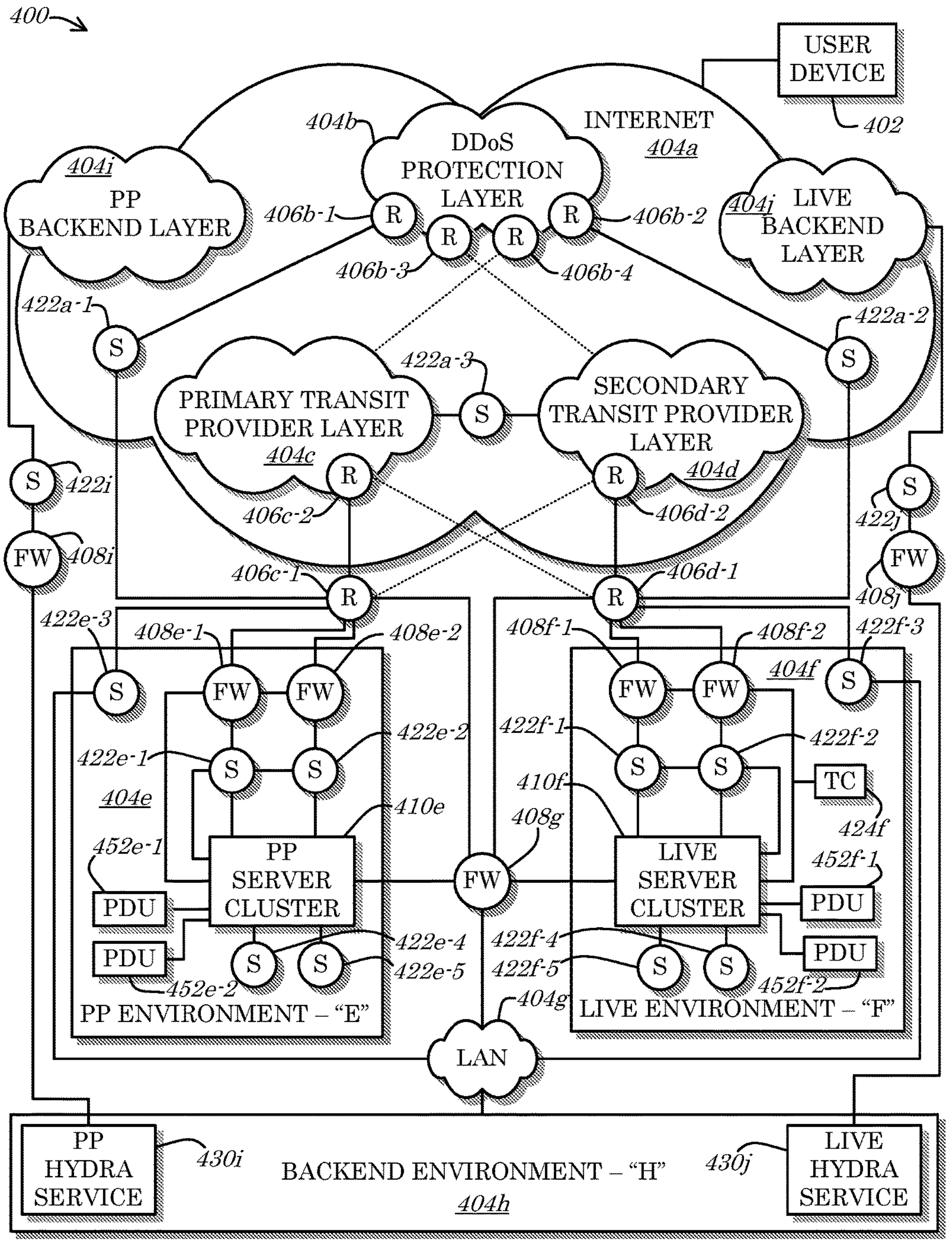
FIG. 4 is a block diagram of a system according to one or more embodiments.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played (e.g., one or more bingo games as described in this disclosure). The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404*a-j* (e.g., the Internet 404*a*, a Distributed Denial-of-Service (DDoS) protection layer 404*b*, a primary transit provider layer 404*c*, a secondary transit provider layer 404*d*, a Pre-Production (PP) environment 404*e*, a live environment 404*f*, a LAN 404*g*, a backend environment 404*h*, a PP backend layer 404*i*, and/or a live backend layer 404*j*), a plurality of routers 406*b-d*, a plurality of firewall devices 408*e-g*, 408*i-j*, a plurality of servers 410*e-f* (e.g., a PP server cluster 410*e* and/or a live server cluster 410*f*), a plurality of switching devices 422*a*, 422*e-f*, 422*i-j*, a Terminal Concentrator (TC) 424*f*, a plurality of "hydra" services 430*i-j* (e.g., a PP hydra service 430*i* and/or a live hydra service 430*j*), and/or a plurality of Power Distribution Unit (PDU) devices 452*e-f*.

According to some embodiments, any or all of the components 402, 404*a-j*, 406*b-d*, 408*e-g*, 408*i-j*, 410*e-f*, 422*a*, 422*e-f*, 422*i-j*, 424*f*, 430*i-j*, 452*e-f* of the system 400 may be similar in configuration and/or functionality to any similarly named and/or numbered components described in this disclosure. Fewer or more components 402, 404*a-j*, 406*b-d*, 408*e-g*, 408*i-j*, 410*e-f*, 422*a*, 422*e-f*, 422*i-j*, 424*f*, 430*i-j*, 452*e-f* (and/or portions thereof) and/or various configurations of the components 402, 404*a-j*, 406*b-d*, 408*e-g*, 408*i-j*, 410*e-f*, 422*a*, 422*e-f*, 422*i-j*, 424*f*, 430*i-j*, 452*e-f* may be included in the system 400 without deviating from the scope of embodiments described in this disclosure. While multiple instances of some components 404*a-j*, 406*b-d*, 408*e-g*, 408*i-j*, 410*e-f*, 422*a*, 422*e-f*, 422*i-j*, 430*i-j*, 452*e-f* are depicted and while single instances of other components 402, 424*f* are depicted, for example, any component 402, 404*a-j*, 406*b-d*, 408*e-g*, 408*i-j*, 410*e-f*, 422*a*, 422*e-f*, 422*i-j*, 424*f*, 430*i-j*, 452*e-f* depicted in the system 400 may comprise a single device, a combination of devices and/or components 402, 404*a-j*, 406*b-d*, 408*e-g*, 408*i-j*, 410*e-f*, 422*a*, 422*e-f*, 422*i-j*, 424*f*, 430*i-j*, 452*e-f*, and/or a plurality of devices, as is or becomes desirable and/or practicable. Similarly, in some embodiments, one or more of the various components 402, 404*a-j*, 406*b-d*, 408*e-g*, 408*i-j*, 410*e-f*, 422*a*, 422*e-f*, 422*i-j*, 424*f*, 430*i-j*, 452*e-f* may not be needed and/or desired in the system 400.

In some embodiments, the user device 402 may be utilized to access one or more of the PP environment 404*e*, the live environment 404*f*, and/or the backend environment 404*h* via the Internet 404*a*. In some embodiments, the user device 402 may be utilized to access the backend environment 404*h* and/or the PP hydra service 430*i* via the PP backend layer 404*i*. A PP backend switch device 422*i* and/or a PP backend firewall device 408*i* may, for example, gate and/or control access to the backend environment 404*h* and/or the PP hydra service 430*i*, via the PP backend layer 404*i*. In some embodiments, the user device 402 may be utilized to access the backend environment 404*h* and/or the live hydra service 430*j* via the live backend layer 404*j*. A live backend switch device 422*j* and/or a live backend firewall device 408*j* may, for example, gate and/or control access to the backend environment 404*h* and/or the live hydra service 430*j*, via the live backend layer 404*j*.

According to some embodiments, any communications (e.g., requests, calls, and/or messages) from the user device 402 may be passed through the DDoS protection layer 404*b*. The DDoS protection layer 404*b* may, for example, monitor and/or facilitate protection against various forms of cyber attacks including, but not limited to, DDoS attacks. In some embodiments, the DDoS protection layer 404*b* may comprise and/or be in communication with a plurality of DDoS router devices 406*b*-1, 406*b*-2, 406*b*-3, 406*b*-4 that may be utilized to route and/or direct incoming communications (e.g., from the user device 402) to appropriate portions of the system 400.

In some embodiments, the DDoS protection layer 404*b* and/or a first DDoS router device 406*b*-1 may route communications from the user device 402 through and/or via a first switch device 422*a*-1 and/or to, through, and/or via a first primary transit provider router device 406*c*-1. In some embodiments, the first switch device 422*a*-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406*c*-1 may, for example, provide access to the PP environment 404*e* and/or the PP server cluster 410*e* thereof, such as via one or more PP firewall devices 408*e*-1, 408*e*-2 and/or one or more PP switch devices 422*e*-1, 422*e*-2. According to some embodiments, the PP switch devices 422*e*-1, 422*e*-2 may comprise content switching devices that process and route data (e.g., in the data link layer) based on data content. In some embodiments, the first primary transit provider router device 406*c*-1 may direct communications to, through, and/or via a PP LAN switch device 422*e*-3 that provides and/or facilitates access to the LAN 404*g*. The LAN 404*g* may, for example, provide private access to and/or between the PP environment 404*e*, the live environment 404*f*, and/or the backend environment 404*h*. In some embodiments, the first primary transit provider router device 406*c*-1 and/or the PP LAN switch device 422*e*-3 may direct communications to, through, and/or via a LAN firewall device 408*g* that provides direct access to either or both of the PP server cluster 410*e* and the live server cluster 410*f*.

According to some embodiments, the DDoS protection layer 404*b* and/or a second DDoS router device 406*b*-2 may route communications from the user device 402 through and/or via a second switch device 422*a*-2 and/or to, through, and/or via a first secondary transit provider router device 406*d*-1. In some embodiments, the second switch device 422*a*-2 may comprise a device utilized for security switching such as may implement communications in accordance with the GRE communications tunneling protocol described in RFC 2784 "Generic Routing Encapsulation (GRE)" published by the Network Working Group (NWG) in March, 2000. The first secondary transit provider router device 406*d*-1 may, for example, provide access to the live environment 404*f* and/or the live server cluster 410*f* thereof, such as via one or more live firewall devices 408*f*-1, 408*f*-2 and/or one or more live switch devices 422*f*-1, 422*f*-2. According to some embodiments, the live switch devices 422*f*-1, 422*f*-2 may comprise content switching devices that process and route data (e.g., in the data link layer) based on data content. In some embodiments, the first secondary transit provider router device 406*d*-1 may direct communications to, through, and/or via a live LAN switch device 422*f*-3 that provides and/or facilitates access to the LAN 404*g*. In some embodiments, the first secondary transit provider router device 406*d*-1 and/or the live LAN switch device 422*f*-3 may direct communications to, through, and/or via the LAN firewall device 408*g* that provides direct access to either or both of the PP server cluster 410*e* and the live server cluster 410*f*.

In some embodiments, the DDoS protection layer 404*b* and/or one or more of a third DDoS router device 406*b*-3 and/or a fourth DDoS router device 406*b*-4 may route communications from the user device 402 through and/or via one or more of the primary transit provider layer 404*c* and/or the secondary transit provider layer 404*d*. In some embodiments, a transit provider switch device 422*a*-3 may direct, swap, route, and/or manage communications between the primary transit provider layer 404*c* and the secondary transit provider layer 404*d*. According to some embodiments, the transit provider switch device 422*a*-3 may comprise a switching device that operates in accordance with an Exterior Border Gateway Protocol (EBGP)—e.g., the transit provider switch device 422*a*-3 may comprise one or more edge or border routers. In some embodiments, the first primary transit provider router device 406*c*-1, the first secondary transit provider router device 406*d*-1, a second primary transit provider router device 406*c*-2, and/or a second secondary transit provider router device 406*d*-2 may be utilized to route and/or direct communications between (i) the primary transit provider layer 404*c* and/or the secondary transit provider layer 404*d* and (ii) the PP environment 404*e* and/or the live environment 404*f*.

According to some embodiments, the PP server cluster 410*e* and/or the PP environment 404*e* may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452*e*-1, 452*e*-2 may generally provide power distribution, supply, management, backup, and/or conditioning services (e.g., to the PP server cluster 410*e*) as is or becomes desired. According to some embodiments, additional switch devices 422*e*-4, 422*e*-5 may be utilized to distribute, balance, manage and/or control communications to, from, and/or within the PP server cluster 410*e*.

In some embodiments, the live server cluster 410*f* and/or the live environment 404*f* may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452*f*-1, 452*f*-2 may generally provide power distribution, supply, management, backup, and/or conditioning services (e.g., to the live server cluster 410*f*) as is or becomes desired. According to some embodiments, additional switch devices 422*f*-4, 422*f*-5 may be utilized to distribute, balance, manage and/or control communications to, from, and/or within the live server cluster 410*f*. In some embodiments, the TC device 424*f* may be utilized to manage communications from a variety of data sources such as by providing communication capability between various communications channels (not separately depicted in FIG. 4).

According to some embodiments, the user device 402 in conjunction with the live server cluster 410*f* (e.g., via the Internet 404*a*) may conduct (in whole or in part), facilitate, and/or otherwise be associated with execution of one or more stored procedures, applications, processes, and/or methods (and/or one or more portions and/or combinations thereof) as described in this disclosure.

Figure 5:
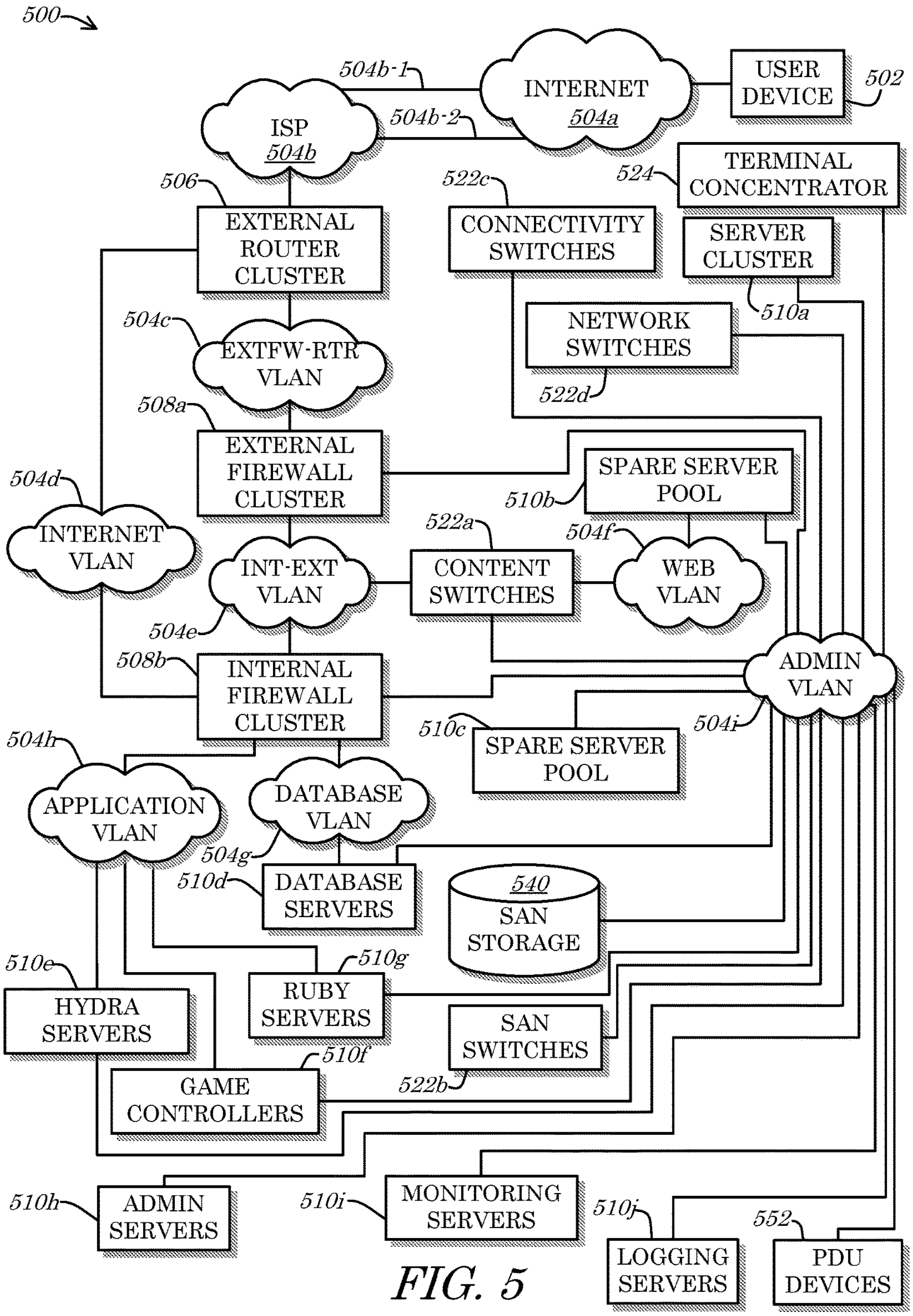
FIG. 5 is a block diagram of a system according to one or more embodiments.

Turning to FIG. 5, a block diagram of a system 500 according to some embodiments is shown. In some embodiments, the system 500 may comprise and/or define a "backend" architecture of a gaming platform such as a platform via which social, multiplayer, and/or online games may be played (e.g., one or more bingo games as described in this disclosure). The system 500 may be utilized in conjunction with the systems 300, 400 if FIG. 3 and/or FIG. 4 in this disclosure, for example, and/or may be similar in configuration and/or functionality to the backend environment 404*h* of the system 400 of FIG. 4. In some embodiments, the system 500 may comprise a user device 502, a plurality of networks (and/or environments and/or layers) 504*a-i* (e.g., the Internet 504*a*, an ISP 504*b*, an External Firewall-Router (EXTFW-RTR) Virtual LAN (VLAN) 504*c*, an Internet VLAN 504*d*, an Internal-External (INT-EXT) VLAN 504*e*, a web VLAN 504*f*, a database VLAN 504*g*, an application VLAN 504*h*, and/or an administrator VLAN 504*i*), an external router cluster 506, a plurality of firewall clusters 508*a-b* (e.g., an external firewall cluster 508*a* and/or an internal firewall cluster 508*b*), a plurality of servers 510*a-j* (e.g., a server cluster 510*a*, a first spare server pool 510*b*, a second spare server pool 510*c*, database servers 510*d*, "hydra" servers 510*e*, game controllers 510*f*, ruby servers 510*g*, admin servers 510*h*, monitoring servers 510*i*, and/or logging servers 510*j*), a plurality of switches 522*a-d* (e.g., content switches 522*a*, Storage Area Network (SAN) switches 522*b*, connectivity switches 522*c*, and/or network switches 522*d*), a TC device 524, a SAN storage device 540, and/or one or more PDU devices 552.

According to some embodiments, any or all of the components 502, 504*a-l*, 506, 508*a-b*, 510*a-j*, 522*a-d*, 524, 540, 552 of the system 500 may be similar in configuration and/or functionality to any similarly named and/or numbered components described in this disclosure. Fewer or more components 502, 504*a-l*, 506, 508*a-b*, 510*a-j*, 522*a-d*, 524, 540, 552 (and/or portions thereof) and/or various configurations of the components 502, 504*a-l*, 506, 508*a-b*, 510*a-j*, 522*a-d*, 524, 540, 552 may be included in the system 500 without deviating from the scope of embodiments described in this disclosure. While multiple instances of some components 504*a-l*, 508*a-b*, 510*a-j*, 522*a-d* are depicted and while single instances of other components 502, 506, 524, 540, 552 are depicted, for example, any component 502, 504*a-l*, 506, 508*a-b*, 510*a-j*, 522*a-d*, 524, 540, 552 depicted in the system 500 may comprise a single device, a combination of devices and/or components 502, 504*a-l*, 506, 508*a-b*, 510*a-j*, 522*a-d*, 524, 540, 552, and/or a plurality of devices, as is or becomes desirable and/or practicable. Similarly, in some embodiments, one or more of the various components 502, 504*a-l*, 506, 508*a-b*, 510*a-j*, 522*a-d*, 524, 540, 552 may not be needed and/or desired in the system 500.

In some embodiments, the user device 502 may be utilized to access and/or interface with one or more of the servers 510*a-j* via the Internet 504*a*. In some embodiments, the Internet 502*a* may be linked to the ISP 504*b* via multiple (e.g., redundant) connectivity paths 504*b*-1, 504*b*-2 (e.g., for load balancing, security, and/or failure recovery). According to some embodiments, the ISP 504*b* may be in communication with (and/or comprise) the external router cluster 506. The external router cluster 506 may route certain requests, calls, and/or transmissions (and/or users—e.g., based on credentials and/or other information) through the EXTFW-RTR VLAN 504*c* and/or through the external firewall cluster 508*a*, for example, and/or may route certain requests, calls, and/or transmissions (and/or users—e.g., based on credentials and/or other information) through the Internet VLAN 504*d* and/or through the internal firewall cluster 508*b*.

In the case that a user (not shown) of the user device 502 comprises an online game player, consumer, and/or other member of the public, for example, the external router cluster 506 may direct communications through the EXTFW-RTR VLAN 504*c* and/or through the external firewall cluster 508*a*. In the case that the user of the user device 502 comprises a programmer, tester, employee, and/or other agent of an entity that operates the system 500, for example, the external router cluster 506 may direct communications through the Internet VLAN 504*d* and/or through the internal firewall cluster 508*b*. In some embodiments, access via either or both of the external firewall cluster 508*a* and/or the internal firewall cluster 508*b* may permit the user device 502 to communicate via the INT-EXT VLAN 504*e*. The INT-EXT VLAN 504*e* may, for example, provide access to the content switches 522*a* which may, in some embodiments, serve content from any or all of the servers 510*a-j* to the user device 502, as is or becomes appropriate or desired. In some embodiments, the content switches 522*a* may communicate with the first spare server pool 510*b* via the web LAN 504*f*.

According to some embodiments, private and/or other specialized access to the system 500 via the internal firewall cluster 508*b* may permit the user device 502 to communicate via one or more of the database VLAN 504*g*, the application VLAN 504*h*, and/or the admin VLAN 504*i*. The database VLAN 504*g* may be utilized, for example, to access and/or communicate with the database servers 510*d*. In some embodiments, the application VLAN 504*h* may be utilized to access and/or communicate with any or all of the hydra servers 510*e*, the game controllers 510*f*, and/or the ruby servers 510*g*.

The admin VLAN 504*i* may allow, promote, conduct, facilitate, and/or manage a wide variety of communications within the system 500. The admin VLAN 504*i* may, for example, communicatively connect and/or couple any or all of the firewalls 508*a-b*, the servers 510*a-j*, the switches 522*a-d*, the TC device 524, the SAN storage 540, and/or the PDU devices 552. The user device 502 may be utilized, in conjunction with the admin servers 510*h* and/or via the admin VLAN 504*i* for example, to define, edit, adjust, manage, and/or otherwise access settings (and/or data) of the firewalls 508*a-b*, any or all of the switches 522*a-d*, the TC device 524, and/or the PDU devices 552. In some embodiments, the user device 502 (and/or the admin servers 510*h*) may be utilized to manage and/or access content, rules, settings, and/or performance characteristics or preferences for any or all of the servers 510*a-j*.

In some embodiments, the server cluster 510*a* may comprise one or more servers and/or other electronic controller devices (e.g., blade servers) configured to provide online gaming data (e.g., interfaces, outcomes, and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, results, graphics, sounds, and/or other media to the user device 502 (e.g., via the application VLAN 504*h*). In some embodiments, the ruby servers 510*g* may comprise one or more processing devices configured to provide access to one or more programming languages (e.g., "Ruby") and/or Application Programming Interface (API) mechanisms via which the servers 510*a-j* and/or other portions of the system 500 may be configured to operate (e.g., in accordance with specially and/or pre-programmed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

According to some embodiments, the user device 502 in conjunction with one or more of the servers 510*a-j* (e.g., via the Internet 504*a*) may conduct (in whole or in part), facilitate, and/or otherwise be associated with execution of one or more stored procedures, applications, processes, and/or methods (and/or one or more portions and/or combinations thereof) as described in this disclosure.

Figure 6:
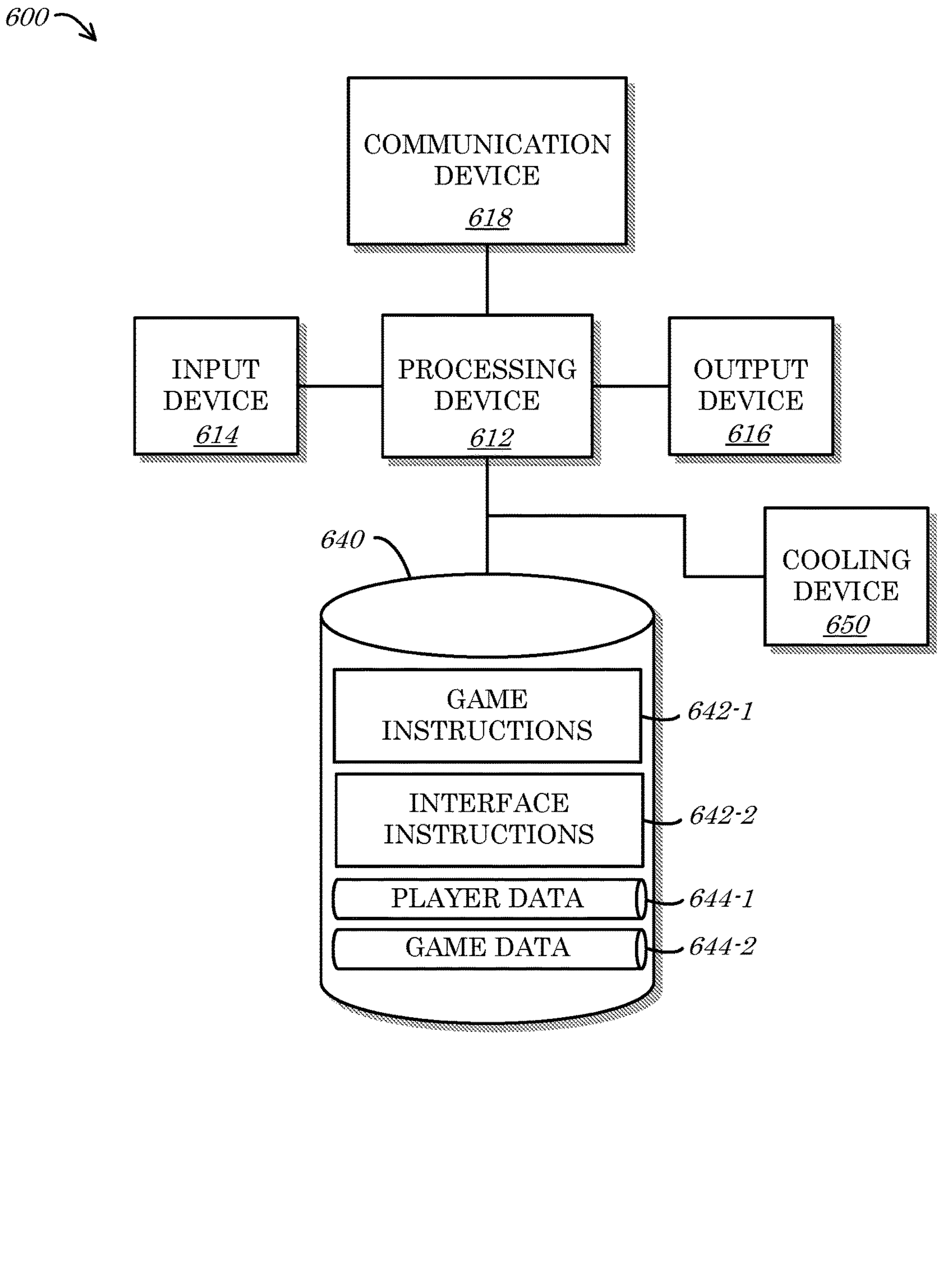
FIG. 6 is a block diagram of an apparatus according to one or more embodiments.

Turning to FIG. 6, a block diagram of an apparatus 600 according to some embodiments is shown. In some embodiments, the apparatus 600 may be similar in configuration and/or functionality to any of the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 in this disclosure, and/or may otherwise comprise a portion of the systems 100, 200, 300, 400, 500 of FIG. 1, FIG. 2, FIG. 3, FIG. 4, and/or FIG. 5 in this disclosure. The apparatus 600 may, for example, execute, process, facilitate, and/or otherwise be associated with the methods described in this disclosure. In some embodiments, the apparatus 600 may comprise a processing device 612, an input device 614, an output device 616, a communication device 618, a memory device 640, and/or a cooling device 650. According to some embodiments, any or all of the components 612, 614, 616, 618, 640, 650 of the apparatus 600 may be similar in configuration and/or functionality to any similarly named and/or numbered components described in this disclosure. Fewer or more components 612, 614, 616, 618, 640, 650 and/or various configurations of the components 612, 614, 616, 618, 640, 650 may be included in the apparatus 600 without deviating from the scope of embodiments described in this disclosure.

According to some embodiments, the processing device 612 may be or include any type, quantity, and/or configuration of electronic and/or computerized processor that is or becomes known. The processing device 612 may comprise, for example, an Intel® IXP 2800 network processor or an Intel® XEON™ Processor coupled with an Intel® E7501 chipset. In some embodiments, the processing device 612 may comprise multiple inter-connected processors, microprocessors, and/or micro-engines. According to some embodiments, the processing device 612 (and/or the apparatus 600 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 600 comprises a server such as a blade server, necessary power may be supplied via a standard AC outlet, power strip, surge protector, a PDU, and/or Uninterruptible Power Supply (UPS) device.

In some embodiments, the input device 614 and/or the output device 616 are communicatively coupled to the processing device 612 (e.g., via wired and/or wireless connections and/or pathways) and they may generally comprise any types or configurations of input and output components and/or devices that are or become known, respectively. The input device 614 may comprise, for example, a keyboard that allows an operator of the apparatus 600 to interface with the apparatus 600 (e.g., by a player, such as to participate in an online game session as described in this disclosure). In some embodiments, the input device 614 may comprise a sensor configured to provide information such as player information to the apparatus 600 and/or the processing device 612. The output device 616 may, according to some embodiments, comprise a display screen and/or other practicable output component and/or device. The output device 616 may, for example, provide a game interface (not explicitly shown in FIG. 6) to a player (e.g., via a website). According to some embodiments, the input device 614 and/or the output device 616 may comprise and/or be embodied in a single device such as a touch-screen monitor.

In some embodiments, the communication device 618 may comprise any type or configuration of communication device that is or becomes known or practicable. The communication device 618 may, for example, comprise a network interface card (NIC), a telephonic device, a cellular network device, a router, a hub, a modem, and/or a communications port or cable. In some embodiments, the communication device 618 may be coupled to provide data to a player device (not shown in FIG. 6), such as in the case that the apparatus 600 is utilized to provide a game interface to a player as described in this disclosure. The communication device 618 may, for example, comprise a cellular telephone network transmission device that sends signals indicative of game interface components to customer and/or subscriber handheld, mobile, and/or telephone device. According to some embodiments, the communication device 618 may also or alternatively be coupled to the processing device 612. In some embodiments, the communication device 618 may comprise an IR, RF, Bluetooth™, and/or Wi-Fi® network device coupled to facilitate communications between the processing device 612 and another device (such as a player device and/or a third-party device).

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of game instructions 642-1 and/or interface instructions 642-2. In some embodiments, the game instructions 642-1 and/or the interface instructions 642-2 may be utilized by the processing device 612 to provide output information via the output device 616 and/or the communication device 618.

According to some embodiments, the game instructions 642-1 may be operable to cause the processing device 612 to process player data 644-1 and/or game data 644-2. Player data 644-1 and/or game data 644-2 received via the input device 614 and/or the communication device 618 may, for example, be processed by the processing device 612 in accordance with the game instructions 642-1.

In some embodiments, the interface instructions 642-2 may be operable to cause the processing device 612 to process player data 644-1 and/or game data 644-2. Player data 644-1 and/or game data 644-2 received via the input device 614 and/or the communication device 618 may, for example, be processed by the processing device 612 in accordance with the interface instructions 642-2. In some embodiments, player data 644-1 and/or game data 644-2 may be fed by the processing device 612 through one or more mathematical and/or statistical formulas and/or models in accordance with the interface instructions 642-2 to provide one or more game interfaces in accordance with embodiments described in this disclosure (e.g., displaying or otherwise transmitting information about one or more bingo symbols, called bingo numbers, and/or winning combinations of bingo symbols).

Any or all of the exemplary instructions and data types described in this disclosure and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 600. According to some embodiments, the memory device 640 may be incorporated into and/or otherwise coupled to the apparatus 600 (e.g., as shown) or may simply be accessible to the apparatus 600 (e.g., externally located and/or situated).

In some embodiments, the apparatus 600 may comprise a cooling device 650. According to some embodiments, the cooling device 650 may be coupled (physically, thermally, and/or electrically) to the processing device 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 600.

One or more of various types of data storage devices may be used in accordance with one or more embodiments discussed in this disclosure. A data storage device may, for example, be utilized to store instructions and/or data, such as the instructions and/or data described in reference to one or more of the example computing devices in this disclosure. One or more types and/or combinations of data storage devices may generally store program instructions, code, and/or modules that, when executed by a processing device cause a particular machine to function in accordance with one or more embodiments described in this disclosure. In some embodiments, instructions stored on a data storage device may, when executed by a processor (such as a processor device described in this disclosure with respect to one or more computing devices), cause the implementation of and/or facilitate the any of the methods, and/or portions or combinations of such methods, described in this disclosure. The following descriptions of some example types of data storage devices are representative of a class and/or subset of computer-readable media that are defined in this disclosure as "computer-readable memory" (e.g., non-transitory memory devices, as opposed to transmission devices or media).

According to some embodiments, a data storage device may comprise one or more various types of internal and/or external hard drives. The data storage device may, for example, comprise a data storage medium that is read, interrogated, and/or otherwise communicatively coupled to and/or via a disk reading device. In some embodiments, the data storage device and/or the data storage medium may be configured to store information utilizing one or more magnetic, inductive, and/or optical means (e.g., magnetic, inductive, and/or optical-encoding). The data storage medium may comprise one or more of a polymer layer, a magnetic data storage layer, a non-magnetic layer, a magnetic base layer, a contact layer, and/or a substrate layer. According to some embodiments, a magnetic read head may be coupled and/or disposed to read data from the magnetic data storage layer.

In some embodiments, a data storage medium may comprise a plurality of data points disposed with the data storage medium. The data points may, in some embodiments, be read and/or otherwise interfaced with via a laser-enabled read head disposed and/or coupled to direct a laser beam through the data storage medium.

In some embodiments, a data storage device may comprise a CD, CD-ROM, DVD, Blu-Ray™ Disc, and/or other type of optically-encoded disk and/or other storage medium that is or becomes know or practicable. In some embodiments, a data storage device may comprise a USB keyfob, dongle, and/or other type of flash memory data storage device that is or becomes know or practicable. In some embodiments, a data storage device may comprise RAM of any type, quantity, and/or configuration that is or becomes practicable and/or desirable. In some embodiments, a data storage device may comprise an off-chip cache such as a Level 2 (L2) cache memory device. According to some embodiments, a data storage device may comprise an on-chip memory device such as a Level 1 (L1) cache memory device.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable in this disclosure.

In some embodiments, one or more specialized machines such as a computerized processing device, a server, a remote terminal, and/or a customer device may implement the various practices described in this disclosure. A computer system of a gaming entity may, for example, comprise various specialized computers that interact to provide for online games as described in this disclosure.

C. Processes

According to some embodiments, processes described in this disclosure may be performed and/or implemented by and/or otherwise associated with one or more specialized and/or computerized processing devices (e.g., the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 in this disclosure), specialized computers, computer terminals, computer servers, computer systems and/or networks, and/or any combinations thereof (e.g., by one or more online game providers and/or online gaming player processing devices). In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described in this disclosure.

Figure 7:
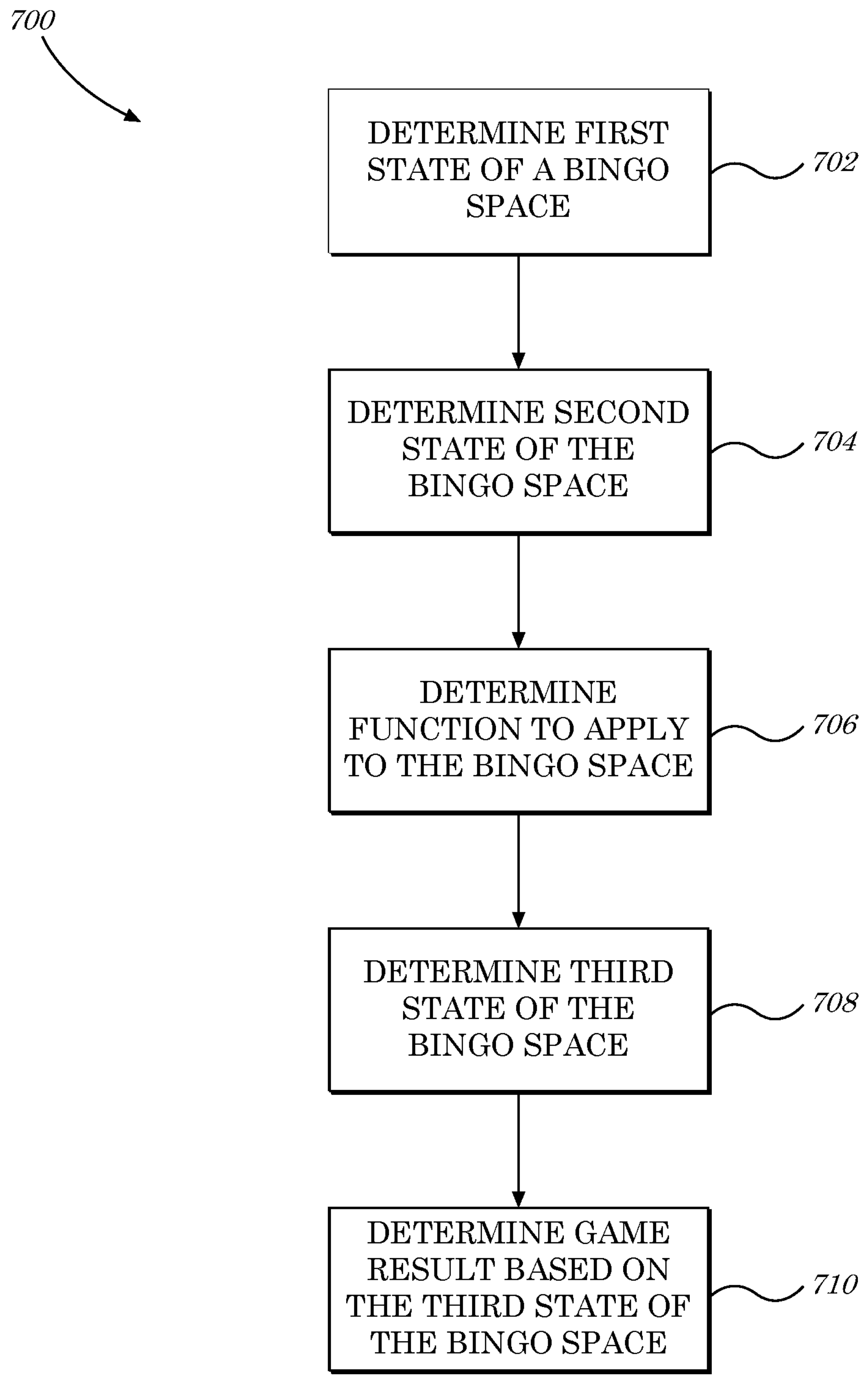
FIG. 7 is a flowchart of a method according to one or more embodiments.

Referring now to FIG. 7, a flow diagram of a method 700 according to some embodiments is shown. The method 700 may be performed, for example, by a server computer (e.g., a game server). It should be noted that although some of the steps of method 700 may be described as being performed by a server computer while other steps are described as being performed by another computing device, any and all of the steps may be performed by a single computing device which may be a mobile device, desktop computer, or another computing device. Further any steps described herein as being performed by a particular computing device may, in some embodiments, be performed by a human or another computing device as appropriate.

According to some embodiments, the method 700 may comprise determining a first state of a bingo space, at 702, and determining a second state of the bingo space, at 704. In some embodiments, determining a state of the bingo space may comprise determining one or more of: (i) whether a bingo space is daubed or undaubed; (ii) whether the bingo space has been acted on and/or affected by a special function of a special ball; (iii) whether the bingo space has a special daub (e.g., a special daub used to mark the bingo space when daubed based on a special function); and/or (iv) whether a current state (e.g., a second state) is different than a previous state (e.g., a first state). According to some embodiments, determining the second state of the bingo space may comprise one or more of: (i) determining the second state after determining the first state; (ii) determining the second state after a ball call; and/or (iii) determining the second state after applying a special function to the bingo space.

According to some embodiments, the method 700 may further comprise determining a function (e.g., a special function associated with a special ball) to apply to the bingo space, at 706, and determining a third state of the bingo space, at 708 (e.g., based on applying a special function). According to some embodiments, the method 700 may further comprise determining a game result based on the third state of the bingo space, at 710.

According to one example, determining a first state of a bingo space may comprise determining that a bingo space is not marked (e.g., at the beginning of a game). Determining a second state of the bingo space may comprise determining that the bingo space is marked, for example, after being daubed by a standard ball and/or a first special ball. Determining a function to apply to the bingo space may comprise, for example, determining a special function associated with a special ball, and determining the third state may comprise determining the effect of the special function applied to the bingo space (e.g., determining that the bingo space has been undaubed by a special ball, determining that the bingo space has been marked with a special daub and/or determining that the bingo space is immune to or otherwise unaffected by the special function). Determining the game result may comprise determining whether the third state of the bingo space (e.g., whether the bingo space is marked or unmarked) contributes to a winning bingo pattern and/or determining whether any special daubs may qualify the player to win a prize.

D. Example Interfaces and Applications

Any or all of the methods described in this disclosure may involve one or more interfaces. One or more of such methods may include, in some embodiments, providing an interface by and/or through which a user may play a bingo game. Although certain types of information are illustrated in the example interfaces, those skilled in the art will understand that the interfaces may be modified in order to provide for additional types of information and/or to remove some of the illustrated types of information, as deemed desirable for a particular implementation.

The following describes some examples of special balls for use in bingo games, and their respective attributes, in accordance with one or more embodiments of the present invention.

According to one embodiment, a special ball is associated with a special function: if a bingo space corresponding to a number associated with the special ball is daubed (e.g., automatically or by a player), in addition to that space being daubed, at least one additional unmarked bingo space (e.g., on one or more bingo cards) is also daubed. In one embodiment, the additional bingo space daubed by the special ball is adjacent to the space matching the ball's number. Alternatively, or in addition, the special function of the special ball may daub any unmarked bingo space (e.g., randomly selected from any one or more bingo cards).

In one embodiment, two or more unmarked spaces may be marked in the same row, column and/or along a diagonal of a bingo card (e.g., starting at a space adjacent to the bingo space corresponding to a number of the special ball). In one implementation, a special ball acts as an "expanding wild", daubing additional bingo spaces travelling in one or more directions from the original marked square, marking all the numbers along the path(s) until an edge of the bingo card is reached. The direction(s) in which additional spaces are marked may be predetermined and/or determined at random and could potentially be horizontal, vertical and/or diagonal. According to some embodiments, the succession of additional free daubs in the direction of travel may be halted by one or more types of bingo spaces (e.g., the center square, a square previously marked in standard play, a square previously affected and/or marked by a special ball)

According to one embodiment, a special ball is associated with a special function: if a bingo space corresponding to a number associated with the special ball is daubed (e.g., automatically or by a player), at least one other marked bingo space is undaubed. In one example, if a player daubs the associated number on one of his bingo cards, an animated "Bad Luck Ball" appears, moves to a currently marked bingo space (e.g., selected at random) and unmarks it. In one embodiment, a player may re-mark any bingo space undaubed as a result of a special ball function. The special action may be applied on more than one bingo card, for example, if the player has the associated number on more than one card.

Figure 8A:
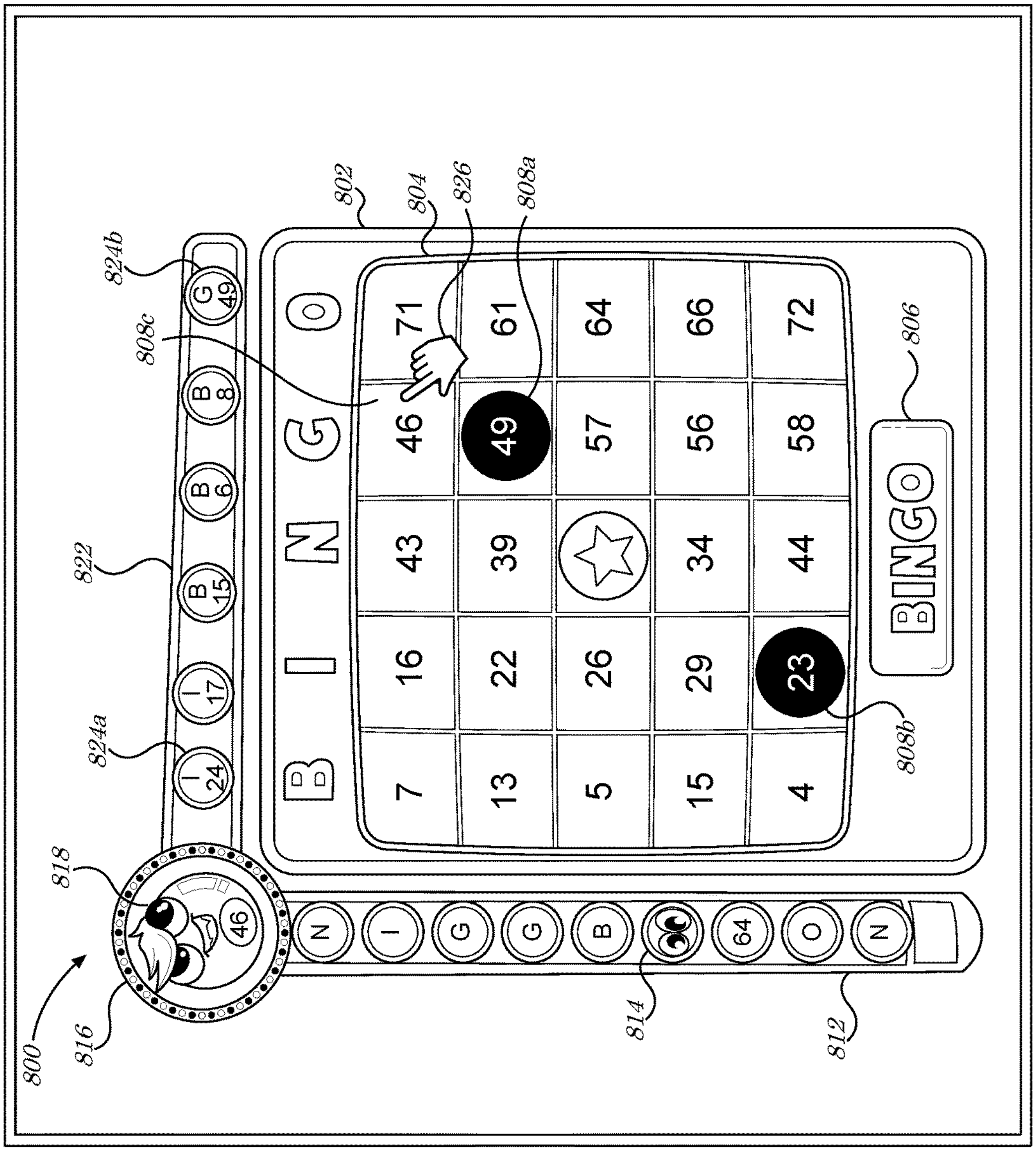
FIG. 8A, FIG. 8B, FIG. 8C, and FIG. 8D depict example user interfaces according to one or more embodiments.

Referring to FIGS. 8A-8D, an example bingo game interface 800 depicts an example of play of a bingo game including a special ball having an associated special function that undaubs one or more previously marked bingo spaces on a bingo card. As depicted in FIG. 8A, the example game interface 800 includes a bingo game space 802 including a bingo card 804 (more than one bingo card may be used in accordance with some embodiments) having marked bingo spaces 808*a* ("49") and 808*b* ("23"), and a bingo button 806 for calling "Bingo" for the bingo card 804. An optional visible ball queue 812 includes a representation of a sequence of balls that could be called for the bingo game (including an indicated special ball 814), and a called ball history 822 includes representations of bingo balls 824*a-b* previously called for the bingo game. According to the example game play depicted in FIG. 8A, a special ball 818 (depicted at 816) is called and a player daubs unmarked bingo space 808*c* ("46"), which matches the number of the special ball 818.

Figure 8B:
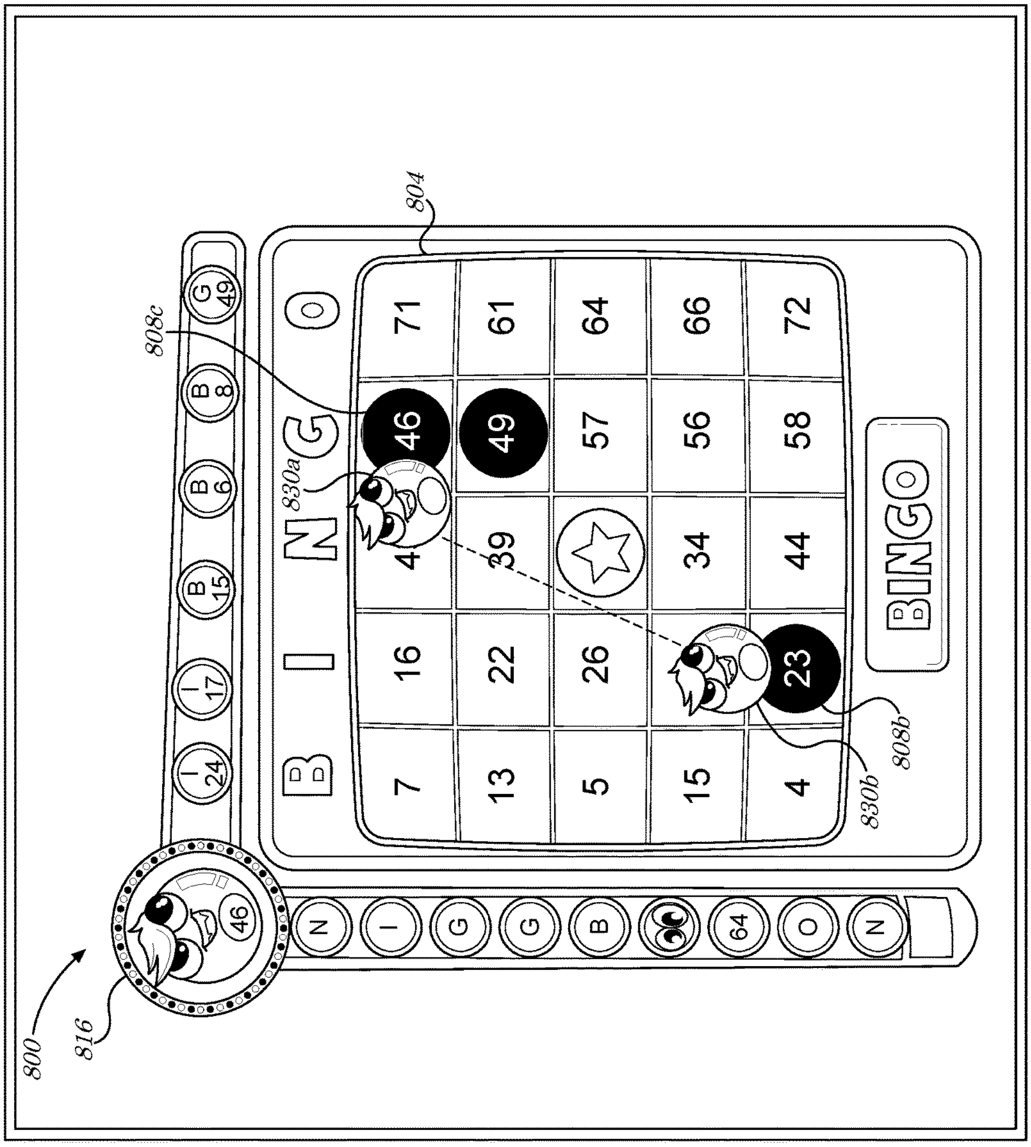
Figure 8C:
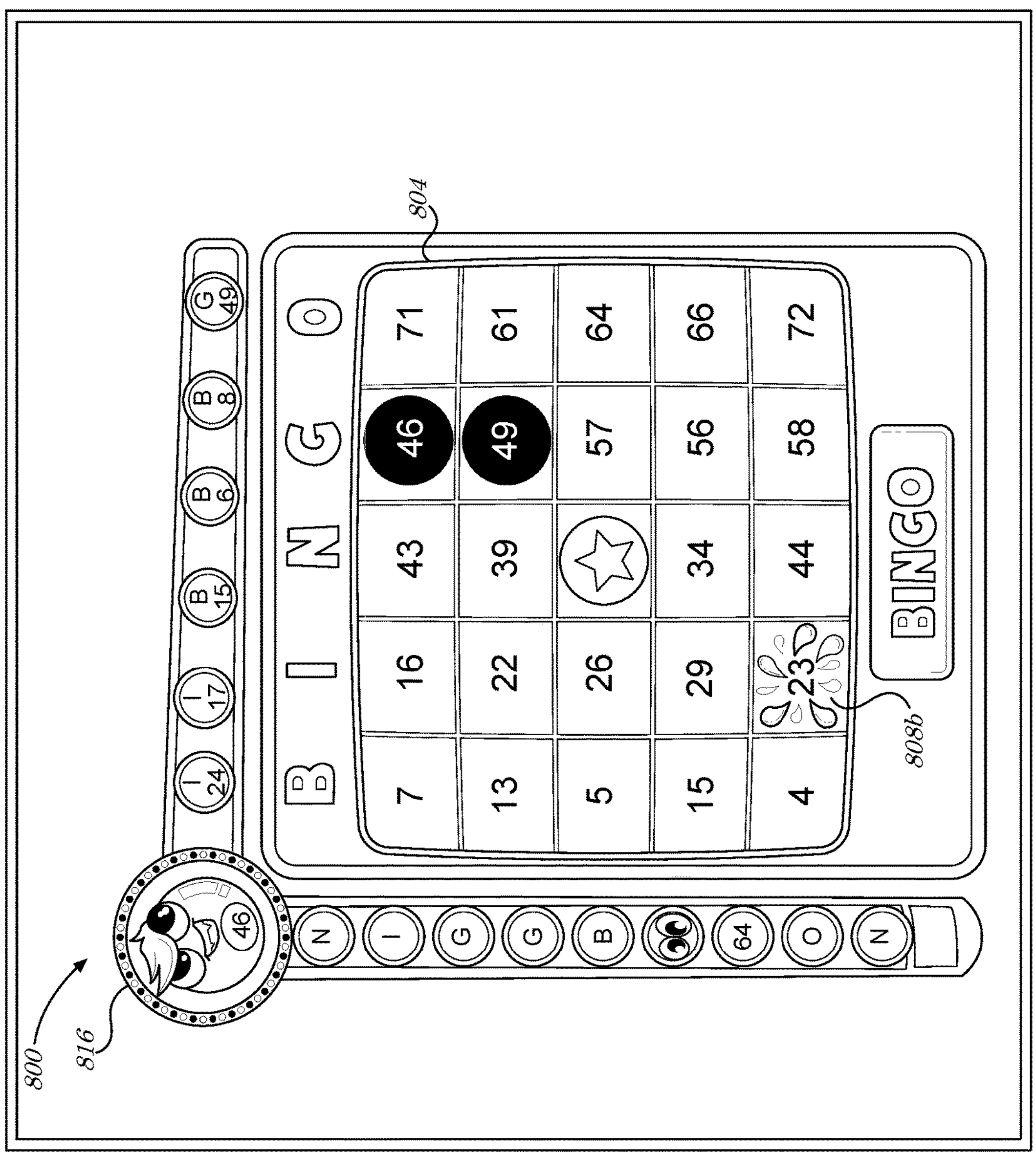
Figure 8D:
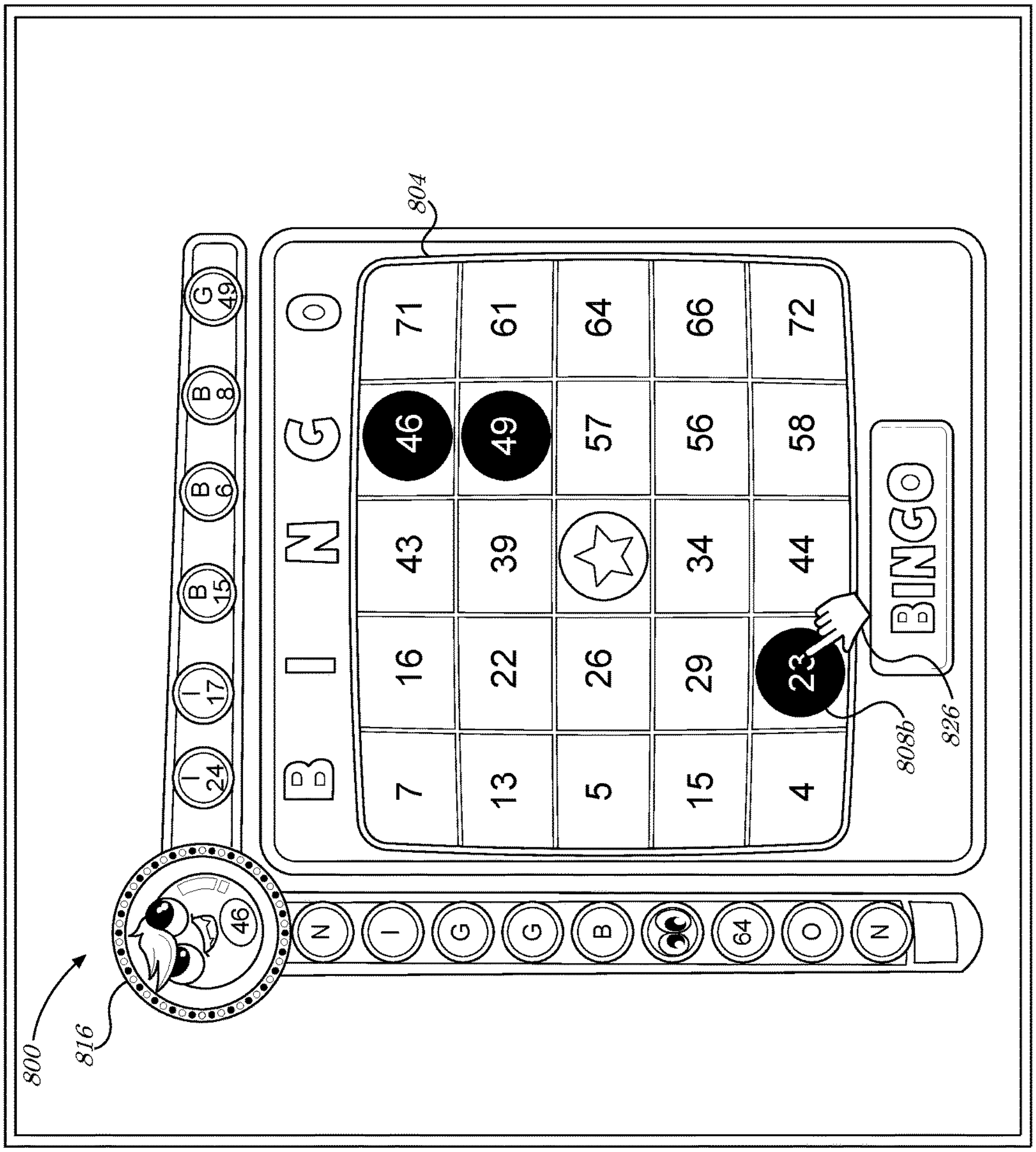

As depicted in FIG. 8B, in response to the "46" being daubed (as indicated at bingo space 808*c*), an animated sequence including representations 830*a* and 830*b* of the special ball moving from the daubed bingo space 808*c* to the daubed bingo space 808*b*. As depicted in FIG. 8C, the represented daub of bingo space 808*b* is shown as being removed or destroyed (e.g., the game interface 800 displays an animated sequence of the daub being cleared). As depicted in FIG. 8D, as a result of the special action of the special ball, a player may want to re-daub bingo space 808*b* using an input device (e.g., as represented by pointer 826).

According to one embodiment, a special ball is associated with a special function: if the special ball is called, the special function obscures one or more of the bingo cards of one or more players (e.g., for a configurable number of ball calls, for a configurable period of time). For example, the bingo game interface may appear blurrier, darker and/or brighter so that it is harder for the player to discern one or more elements of the game interface, such as one or more bingo cards, bingo spaces on the bingo cards, balls in a visible ball queue, messages (e.g., from a chat function), a bingo button for calling bingo, and the like. In some embodiments, the special function may create a visual "whiteout", "blackout" or "flash" effect (e.g., by oversaturating the display with white and/or reducing the visual contrast between different visual elements). In some embodiments, the bingo game interface may remove, replace, overlay and/or cover one or more elements of the bingo game so that they cannot be seen or are more difficult to see. As the effect of this special function may persist over one or more subsequent ball calls, this type of special ball may be described as having a persistent effect (e.g., the bingo game interface is obscured for more than one ball call, and the bingo cards become more visible each time a bingo ball is called).

Figure 9A:
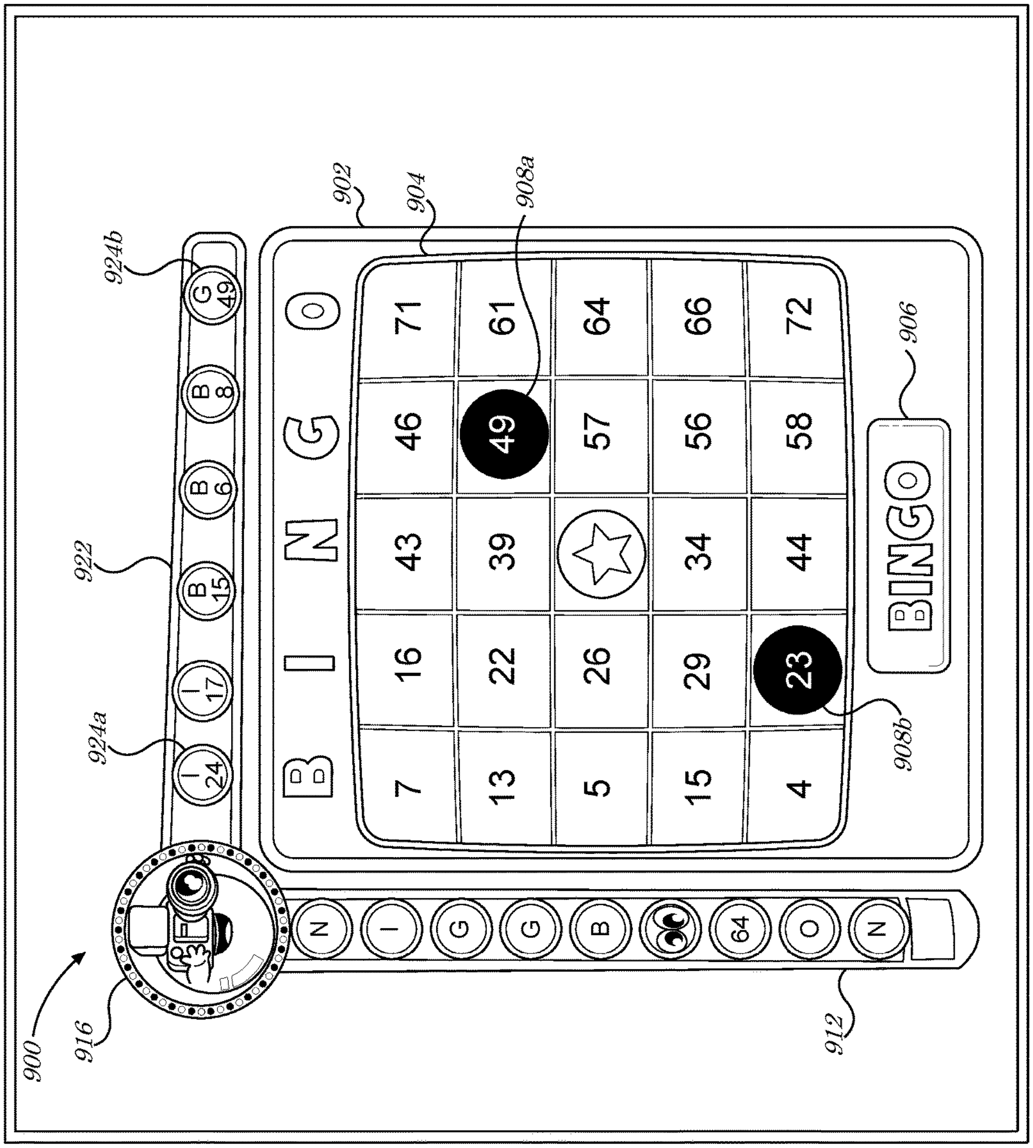
FIG. 9A, FIG. 9B, FIG. 9C, and FIG. 9D depict example user interfaces according to one or more embodiments.
Figure 9B:
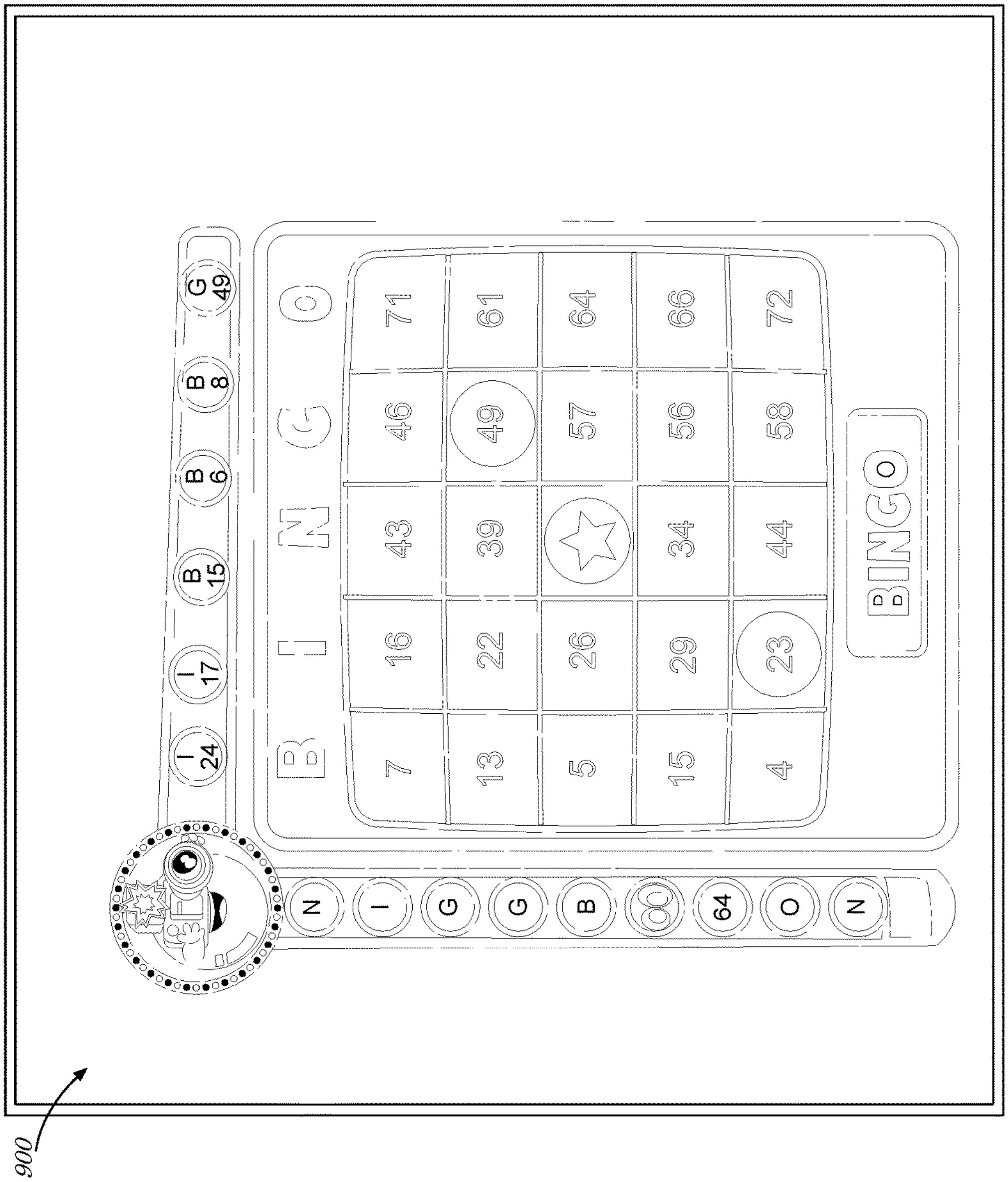
Figure 9C:
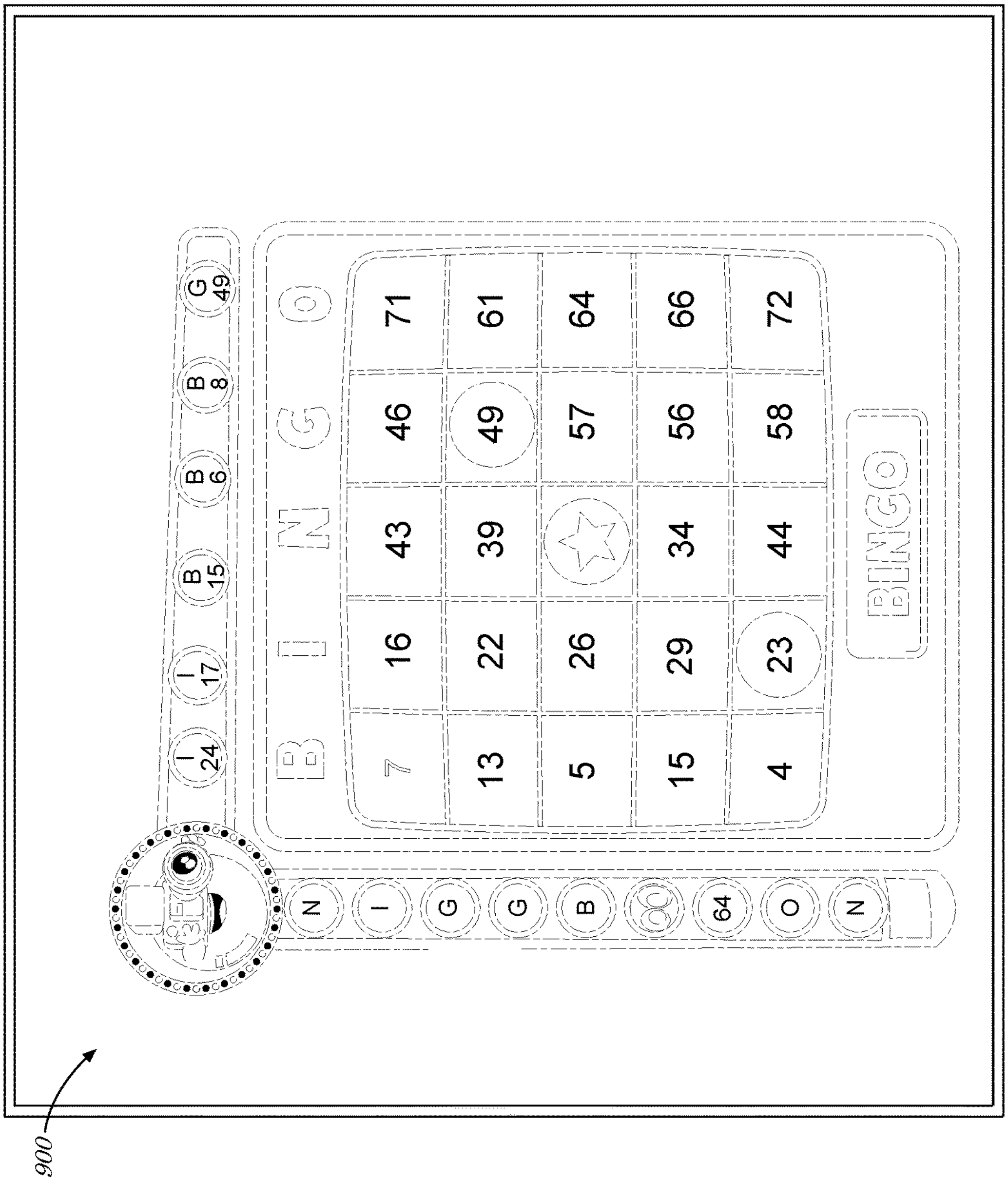
Figure 9D:
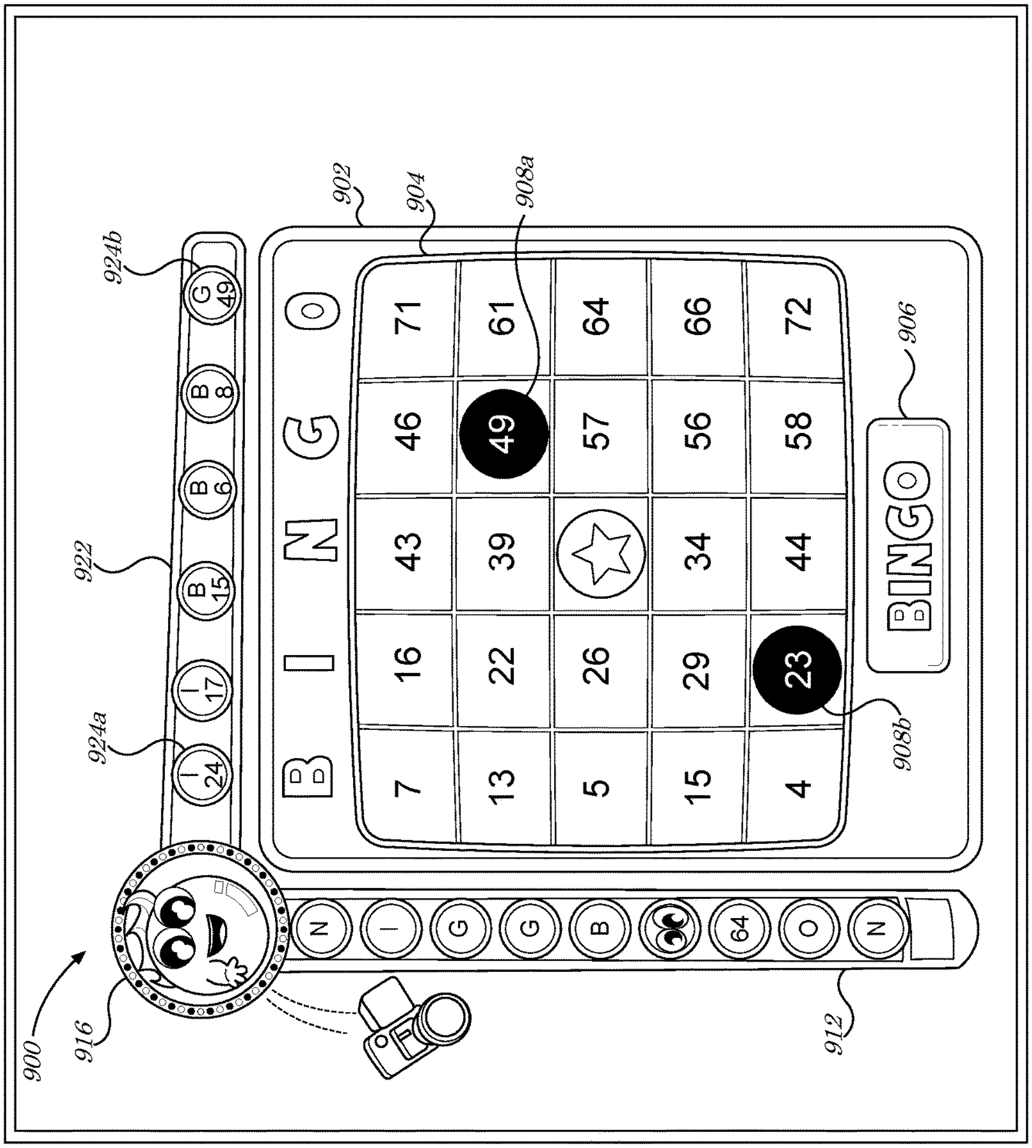

Referring to FIGS. 9A-9D, an example bingo game interface 900 depicts an example of play of a bingo game including a special "Dazzle" ball having an associated special function that modifies the bingo game interface to make one or more elements of the bingo game interface more difficult to see. As depicted in FIG. 9A, the example game interface 900 includes a bingo game space 902 including a bingo card 904 (more than one bingo card may be used in accordance with some embodiments) and a bingo button 906. An optional visible ball queue 912 includes a representation of a sequence of balls that could be called for the bingo game, and a called ball history 922 includes representations of bingo balls 924*a-b* previously called for the bingo game. Bingo spaces 908*a* and 908*b* have been daubed. According to the example game play, a Dazzle ball (depicted at 916) is called. Upon being called, the Dazzle ball initiates an animated sequence depicting a bingo ball character taking a photo. This triggers a "blinding" flash of light over the cards of the player (e.g., as if the player were temporarily blinded by a camera flash), as depicted in FIG. 9B, in which the example bingo game interface 900 has been modified so that the outlines of some of the visual game elements are (intentionally) more difficult to see (e.g., the lines defining the bingo card and bingo numbers are fainter). As depicted in FIG. 9C, the animated light effect begins to clear a little (e.g., each time a ball is called), until full visibility is restored (e.g., after a pre-configured number of ball calls), as depicted in FIG. 9D.

According to one embodiment, a special ball (which may be referred to in this disclosure, by way of non-limiting example, as a "Wipeout" ball) is associated with a special function: if a bingo card has a winning or "bingo" status (e.g., a winning bingo pattern has been achieved and a player has called "bingo"), the special function clears the "bingo" status. In one embodiment, any marked bingo spaces (e.g., that completed a winning bingo pattern) remain even if the bingo status is cleared. In one embodiment, the Wipeout ball may clear a leaderboard or other status information display of bingos already called for the player. In some embodiments, the Wipeout ball may affect more than one player (e.g., in an on-line bingo game room). According to one example, the Wipeout Ball is not associated with any bingo number.

In one or more embodiments, when a Wipeout ball is called it triggers an animated sequence (e.g., via a bingo game interface) of a wave covering at least a portion of the bingo game and/or "washing" out any indicated "bingo" status for one or more player bingo cards. In one embodiment, players then have to click a "BINGO" button on their cards (e.g., as quickly as possible) in order to regain the "bingo" status and/or to regain a place on a leaderboard tracking bingo wins.

Figure 10A:
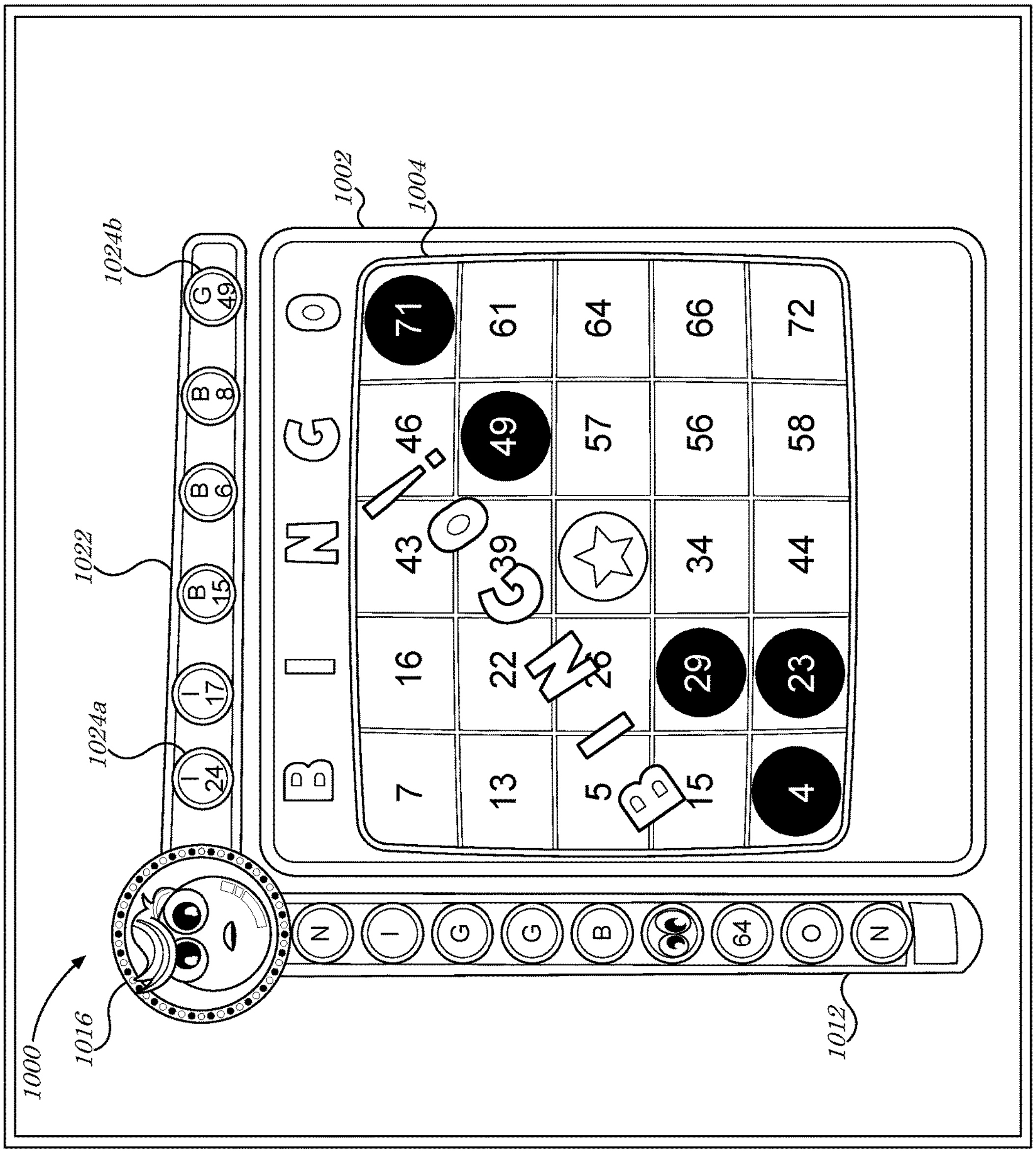
FIG. 10A, FIG. 10B, and FIG. 10C depict example user interfaces according to one or more embodiments.
Figure 10B:
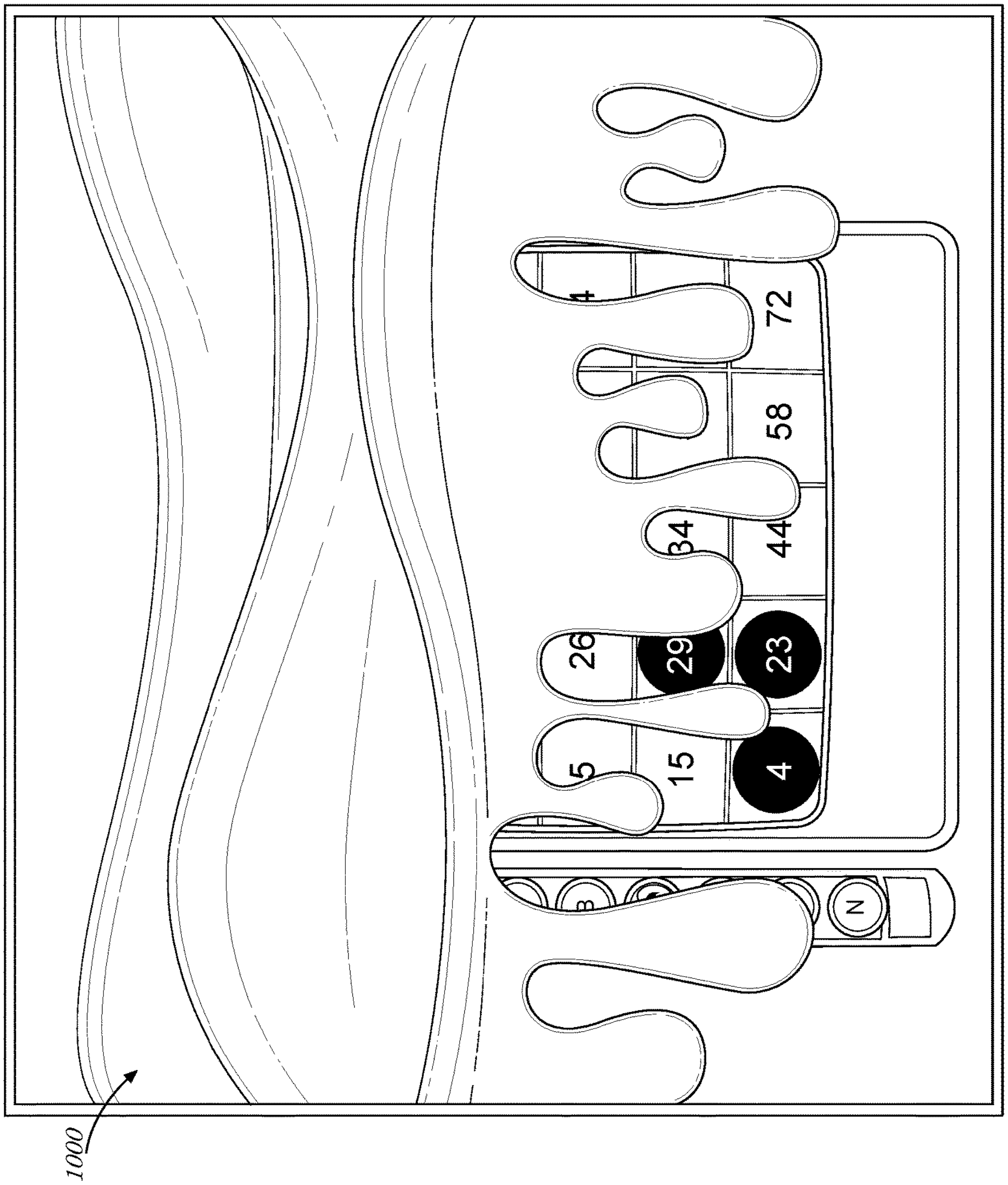
Figure 10C:
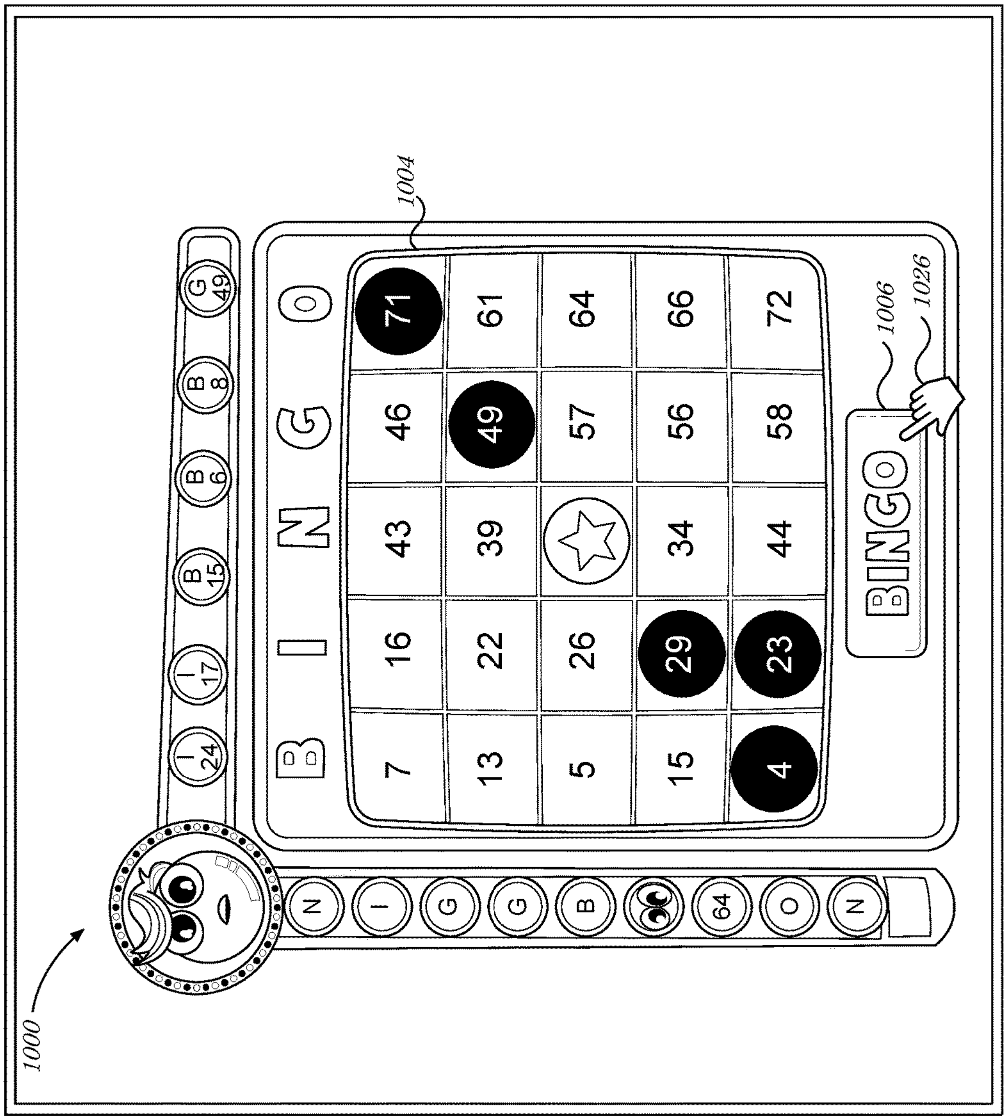

Referring to FIGS. 10A-10C, an example bingo game interface 1000 depicts an example of play of a bingo game including a special ball having an associated special function that removes the "bingo" status of one or more bingo cards. As depicted in FIG. 10A, the example game interface 1000 includes a bingo game space 1002 including a bingo card 1004 (more than one bingo card may be used in accordance with some embodiments). An optional visible ball queue 1012 includes a representation of a sequence of balls that could be called for the bingo game, and a called ball history 1022 includes representations of bingo balls 1024*a-b* previously called for the bingo game. According to the example game play, a Wipeout ball (depicted at 1016) is called while the bingo card 1004 has a status of "Bingo" (e.g., the player achieved a winning diagonal pattern and called Bingo using a Bingo button (not shown)). For example, the Wipeout ball may have moved out of visible ball queue 1012.

As depicted in FIG. 10B, in response to the Wipeout ball being called, the game interface 1000 displays an animated sequence of a wave washing over at least a portion of the game. As depicted in FIG. 10C, as a result of the special action of the Wipeout ball, the previous "bingo" status for the bingo card 1004 has been cleared (e.g., reset to a non-ningo status). For example, although the card still includes a winning bingo pattern, the previously established "bingo" status (as shown in FIG. 10A) has been removed. In order to regain the Bingo status, a player may have to actuate a bingo button 1006 (or other interface element) using an input device (e.g., as represented by pointer 1026) in order to again call "Bingo" for the card.

It will be readily understood that a bingo space on a bingo card may be daubed or not. Accordingly, a given bingo space may be described as having an associated state, for example, of "daubed" or "not daubed". The state of one or more spaces of a bingo card may be stored, for example, in a data storage device, for use in tracking a player's progress in a bingo game, for determining when a player may qualify for a winning bingo pattern, etc.

According to some embodiments, as discussed in this disclosure, some types of special functions associated with one or more special balls may provide for one or more additional or "free" daubs (e.g., in addition to any daub corresponding to a number of a special ball). In some embodiments, a bingo space daubed by a special ball may be described as having a special daub, and an indication of the special daub status may be stored (e.g., in a data storage device) in association with the bingo space. A special daub status associated with a bingo space may include an indication of what type of special ball provided the daub (e.g., "Coconut daub", "Mirror daub"), and this information may be used, in accordance with some embodiments, to determine one or more combined and/or persistent effects with respect to the bingo space (e.g., based on one or more later ball calls). Also, according to some embodiments, some types of special balls may mark bingo spaces with special daubs, to provide a player with a visual indication of the special function and/or possible persistent effect of the special function. According to some embodiments, if a second, subsequent special bingo ball (and/or its effect) interacts with a bingo space previously marked by a first special ball (e.g., with a first special daub), one or more additional free daubs (and/or other types of rewards) may be provided to the player and/or one or more effects may be created based on the interaction or combined effects of the first and second special balls.

In one example of a persistent effect of a special ball and/or of a special daub, when a number corresponding to a special Coconut ball is daubed, the special ball also drops coconuts on three (3) nearby spots to mark them. The special Coconut daubs may have one or more persistent effects. In one embodiment, the special Coconut daub marker will remain on the squares the coconuts fell onto (e.g., instead of being marked with a standard daub mark). In one embodiment, calling "Bingo" on a ticket allows the player to "crack open" any of the special Coconut daubs open (e.g., for additional prizes). In one embodiment, Coconut daubs may be safe from any adverse effects of other special balls, such as a special ball that removes previous daubs. In some embodiments, if a number previously daubed by a special ball is called (e.g., "52" was daubed by a falling coconut and then at a later time a standard "52" ball is called and enters play), that special daub reveals an additional prize. In one or more embodiments, if a number previously daubed by a special daub comes up, that special daub may award one or more additional daubs (e.g., a special Coconut daub sprouts a new palm tree and deposits one or more new Coconut daubs).

According to some embodiments utilizing a persistent and/or combined effect of special balls, a bingo space is daubed based on a first special ball. For example, a bingo space corresponding to the number of a special ball may be daubed, or a bingo space may be daubed based on a special function of a special ball (e.g., the special ball daubs one or more additional bingo spaces). As discussed in this disclosure, a space daubed based on a special ball may receive a special daub (e.g., a different type of daub mark may be used to distinguish the marked space visually from spaces marked by standard ball calls and/or by other types of special balls). The special daub may be described as a having a persistent effect if the special daub status effects play of the bingo game (at least with respect to that space) later in the game. In one example, when a later special ball is applied to the same bingo space that has the previous special daub, the effect of applying the special function of the later special ball may be determined based on the previous special daub and/or the previous special function applied to that space. In one example, a bingo space with a special daub may be immune from the special function of a later special ball that would normally have undaubed that bingo space. In another example, a bingo space marked with a special daub may affect the special function of a later special ball by causing the later special function to effect one or more other bingo spaces (e.g., by "deflecting" and/or multiplying the effect onto adjacent bingo spaces). For example, when a Mirror ball daub is in a path of a laser effect from a special Laser ball that daubs multiple spaces along the path the laser travels, the laser may be "reflected" by the Mirror ball daub, marking one or more additional free daubs along another row, column and/or diagonal.

Figure 11A:
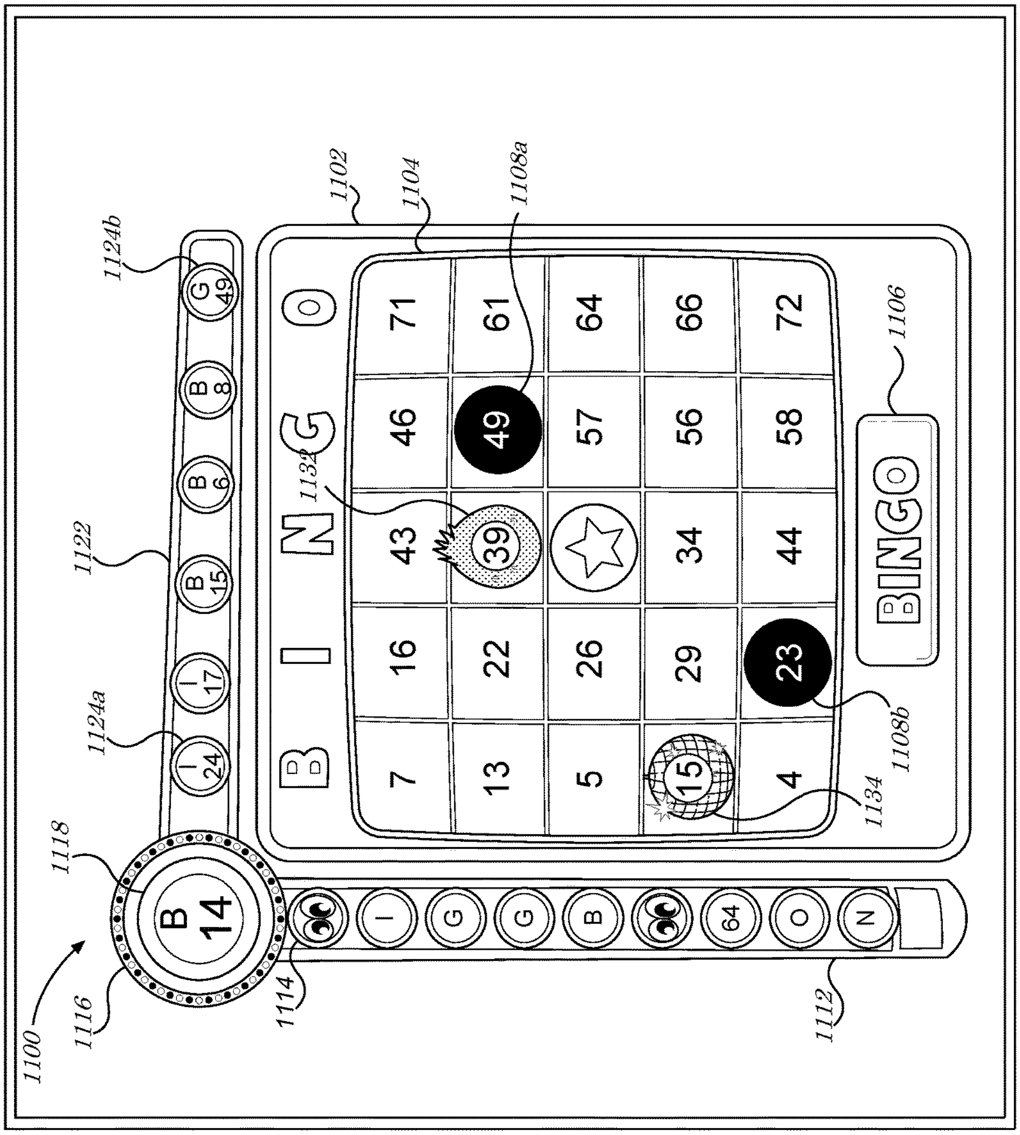
FIG. 11A, FIG. 11B, and FIG. 11C depict example user interfaces according to one or more embodiments.

Referring to FIGS. 11A-10C, an example bingo game interface 1100 depicts an example of play of a bingo game including persistent special ball effects and combined effects of special balls. As depicted in FIG. 11A, the example game interface 1100 includes a bingo game space 1102 including a bingo card 1104 (more than one bingo card may be used in accordance with some embodiments). An optional visible ball queue 1112 includes a representation of a sequence of balls that could be called for the bingo game (including a special ball 1114), and a called ball history 1122 includes representations of bingo balls 1124*a-b* previously called for the bingo game. A bingo button 1106 is provided to allow a player to call "Bingo" for the bingo card 1104. According to the example game play, a standard ball 1118 ("B14") was called most recently (as depicted at 1116). Also according to the example game play depicted in FIG. 11A, bingo spaces 1108*a* and 1108*b* were marked previously (e.g., using standard daubs), bingo space 1132 has been marked with a first special daub (an example Coconut daub) and bingo space 1134 has been marked with a second special daub (an example Mirror Ball daub).

Figure 11B:
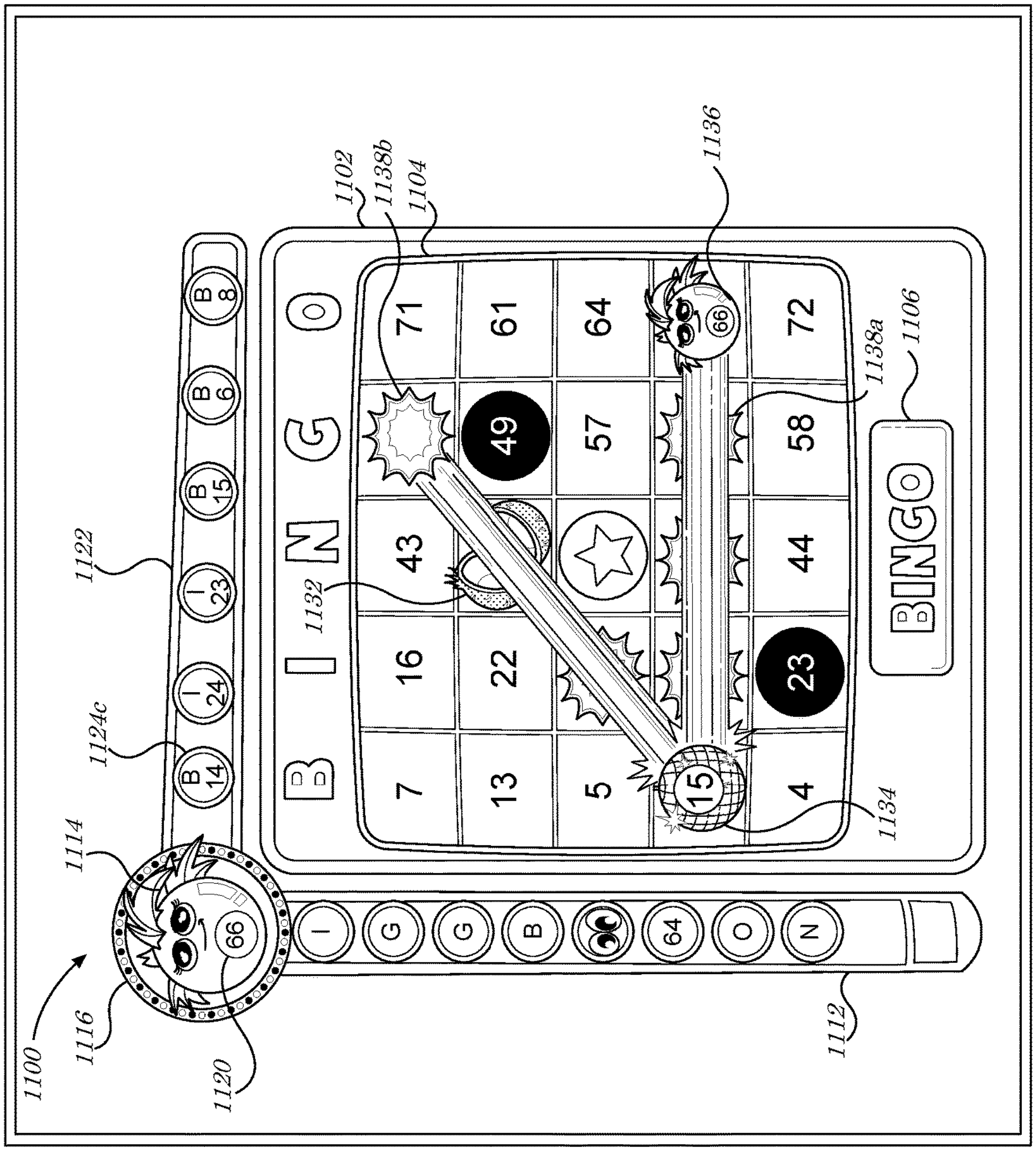

FIG. 11B depicts a continuation of the example game play, in which the called ball 1124*c* ("B14") now appears in the called ball history 1122), and the special ball 1114 (an example special "Laser" ball with an associated bingo number 1120 ("66")) has been called (as depicted at 1116) (e.g., by advancing out of the visible ball queue 1112). The corresponding bingo space 1136 ("66" on the bingo card 1104) has been daubed and a corresponding animated sequence has been invoked to depict application of a special function: a simulated laser beam traveling across the bingo card 1104. According to the example, the special function of the example Laser ball daubs multiple bingo spaces (e.g., bingo space 1138*a*) along a direction of travel. According to the example, the special effect of the Laser ball may typically have traveled in a straight path ending at the end of the row (at bingo space 1134). However, in the case of the example game play, the persistent effect of the previous special Mirror ball (e.g., indicated by the special Mirror daub), in combination with the special function of the special Laser ball, deflects the path of the simulated laser and daubs and/or effects additional bingo spaces along a different path of travel (e.g., at bingo space 1132 and bingo space 1138*b*). According to the example, the laser effect daubs the bingo space 1138*b* (e.g., with a special Laser daub) and also provides a combined special effect on the bingo space 1132.

Figure 11C:
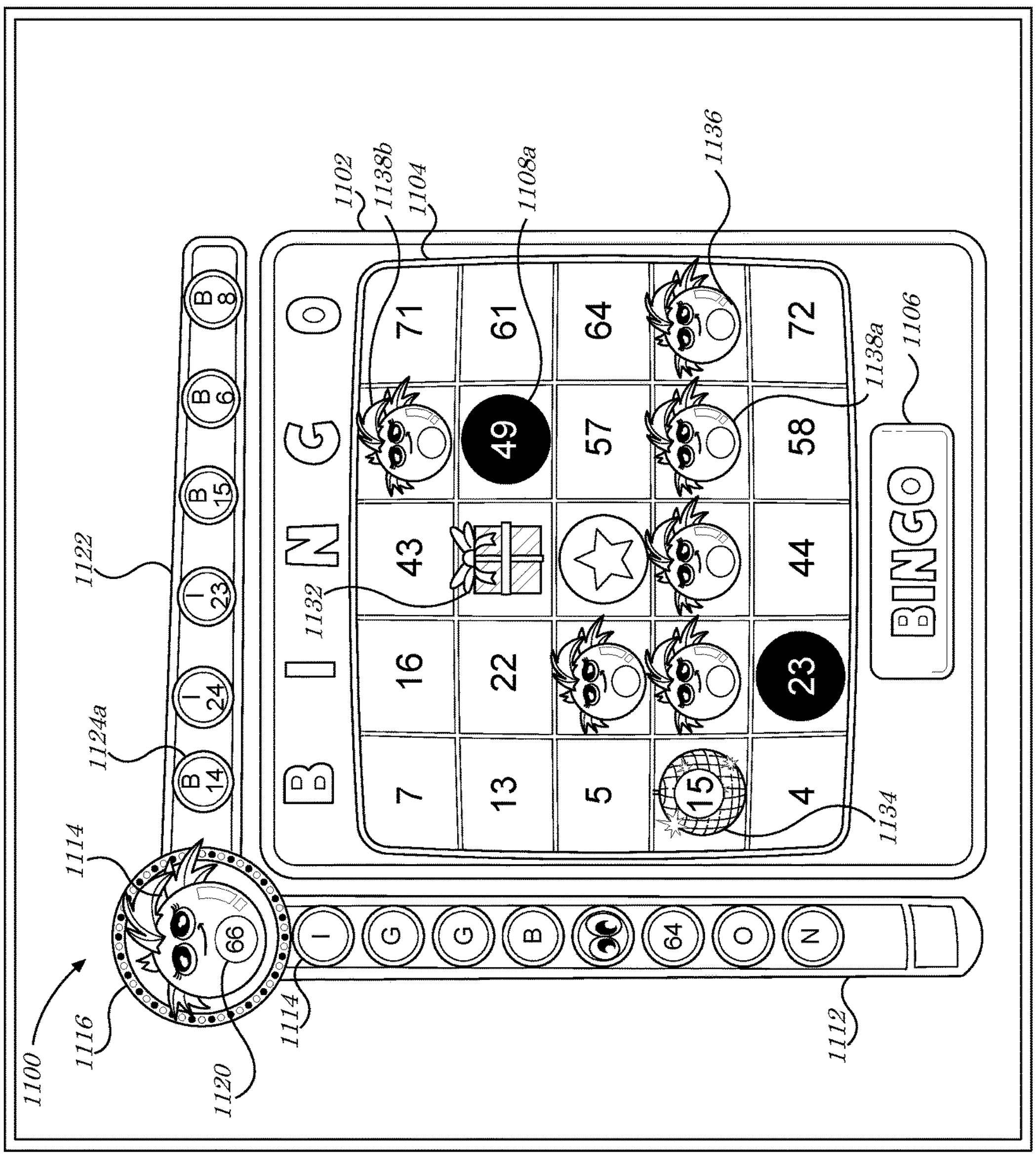

Specifically, as depicted in the examples of game play in FIG. 11B and FIG. 11C, the laser "splits" the special Coconut daub to reveal a prize daub at bingo space 1132. In some embodiments, a prize corresponding to a prize daub may be rewarded to the player, for example, immediately on being revealed, on completion of a game, upon the daub being included in winning bingo pattern, upon the player calling bingo and/or at the end of a bingo game or session. As depicted in FIG. 11C, the example game play has resulted in daubing the "66" bingo space 1136 and five additional spaces (e.g., including 1138*a*, 1138*b*) being daubed, based on the combination of the example special Laser function with the example special Mirror Ball function (or daub) and example special Coconut ball function (or daub).

According to one embodiment, a special ball is associated with a special function: if called and/or if a bingo space corresponding to a number associated with the special ball is daubed (e.g., automatically or by a player), the player may receive one or more rewards, prizes, cash, virtual tokens and/or virtual currency for use on a gaming platform and/or bingo game.

In some embodiments, a bingo game may be associated with tokens or other type of in-game currency that may be used, for example, to be awarded prizes. Accordingly, in some embodiments, a special ball may award one or more such tokens when called, thereby given the player additional chances to win prizes.

In some embodiments, a bingo game may be associated with one or more powerup actions that a player may use during play (e.g., initiated by the player clicking on an associated interface button and not by any special ball). In one embodiment, a powerup may be associated with a meter that increases and/or decreases in value based on time played and/or certain game events. When the powerup meter reaches a predetermined level, for example, the player may use the special action associated with the powerup. In some embodiments, a special ball may be associated with a special action that increases or decreases a powerup meter corresponding to one or more powerups (e.g., in order to decrease the amount of time it would have otherwise taken for the meter to reach a predetermined level for use).

According to one embodiment, a special ball is associated with a special function that provides a particular benefit: if a bingo space corresponding to a number associated with the special ball is daubed (e.g., automatically or by a player), a player may receive the benefit that a timer for a tournament format is temporarily paused (and/or time on the timer is increased). In one example, if a player correctly marks the number of a special "Freeze" ball in a bingo tournament, the corresponding special action stops the player's tournament play clock for a predetermined period of time (e.g., 10 seconds).

According to one embodiment, a special ball is associated with a special function that provides a particular benefit: if called and/or if a bingo space corresponding to a number associated with the special ball is daubed (e.g., automatically or by a player), a player may receive the benefit that a score earned by the player (e.g., in a bingo tournament format) may be multiplied. In one example, when a "Double Up" ball is called, the Double Up ball jumps on to the player's score and doubles it.

According to one embodiment, a special ball is associated with a special function that provides a particular benefit: if called and/or if a bingo space corresponding to a number associated with the special ball is daubed (e.g., automatically or by a player), the special function provides a pause or break in the calling of balls (e.g., for a predetermined period of time). For example, the bingo game may take a longer time to call the next ball than normal, which may allow a player to catch up on daubing balls that were previously called but which the player may have missed.

E. Additional Embodiments

While some embodiments described in this disclosure may make advantageous use of the visible ball queue by including one or more special balls, special balls are not required to be used with a visible ball queue, and no individual special ball is required to validate the advantages of the visible ball queue functionality.

Interpretation

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided herein, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an “alternate”, “alternative”, and/or “alternate embodiment” is intended to connote one or more possible variations—not mutual exclusivity. In other words, it is expressly contemplated that “alternatives” described herein may be utilized and/or implemented together, unless they inherently are incapable of being utilized together.

The terms “including”, “comprising” and variations thereof mean “including but not limited to”, unless expressly specified otherwise.

The terms “a”, “an” and “the” mean “one or more”, unless expressly specified otherwise.

The term “plurality” means “two or more”, unless expressly specified otherwise.

The term “herein” means “in the present application, including the specification, its claims and figures, and anything which may be incorporated by reference, unless expressly specified otherwise.

The phrase “at least one of”, when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase “based on” does not mean “based only on”, unless expressly specified otherwise. In other words, the phrase “based on” describes both “based only on” and “based at least on”. In some embodiments, a first thing being “based on” a second thing refers specifically to the first thing taking into account the second thing in an explicit manner. In such embodiments, for example, a processing step based on the local weather, which itself is in some manner based on or affected by (for example) human activity in the rainforests, is not “based on” such human activities because it is not those activities that being explicitly analyzed, included, taken into account, and/or processed.

The term “whereby” is used herein only to precede a clause or other set of words that express only the intended result, objective or consequence of something that is previously and explicitly recited. Thus, when the term “whereby” is used in a claim, the clause or other words that the term “whereby” modifies do not establish specific further limitations of the claim or otherwise restricts the meaning or scope of the claim.

The term “wherein”, as utilized herein, does not evidence intended use. The term “wherein” expressly refers to one or more features inclusive in a particular embodiment and does not imply or include an optional or conditional limitation.

Where a limitation of a first claim would cover one of a feature as well as more than one of a feature (e.g., a limitation such as “at least one widget” covers one widget as well as more than one widget), and where in a second claim that depends on the first claim, the second claim uses a definite article “the” to refer to the limitation (e.g., “the widget”), this does not imply that the first claim covers only one of the feature, and this does not imply that the second claim covers only one of the feature (e.g., “the widget” can cover both one widget and more than one widget).

When an ordinal number (such as “first”, “second”, “third” and so on) is used as an adjective before a term, that ordinal number is used (unless expressly specified otherwise) merely to indicate a particular feature, such as to allow for distinguishing that particular referenced feature from another feature that is described by the same term or by a similar term. For example, a “first widget” may be so named merely to allow for distinguishing it in one or more claims from a “second widget”, so as to encompass embodiments in which (1) the “first widget” is or is the same as the “second widget” and (2) the “first widget” is different than or is not identical to the “second widget”. Thus, the mere usage of the ordinal numbers “first” and “second” before the term “widget” does not indicate any other relationship between the two widgets, and likewise does not indicate any other characteristics of either or both widgets. For example, the mere usage of the ordinal numbers “first” and “second” before the term “widget” (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers “first” and “second” before the term “widget” does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a FDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein. According to some embodiments, a "processor" may primarily comprise and/or be limited to a specific class of processors referred to herein as "processing devices". "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. §101.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. An online game server comprising:

a processor; and a computer-readable memory in communication with the processor, the computer-readable memory storing instructions that when executed by the processor direct the processor to:

receive, from a user device, a call for an online gaming interface for a bingo game;

generate an online gaming interface for the user device, the online gaming interface comprising a bingo card for the bingo game;

determine a first special ball associated with a first special function;

apply the first special function to at least one bingo space of the bingo card;

determine a second special ball associated with a second special function; and after applying the first special function to the at least one bingo space, display an animated sequence on the online gaming interface depicting a combined effect of the first special function and the second special function on the at least one bingo space.

2. The apparatus of claim 1, wherein the animated sequence overlays the at least one bingo space.

3. The apparatus of claim 1, the computer-readable memory further storing instructions that when executed by the processor direct the processor to:

determine a game result for the bingo game based on the combined effect of the first special function and the second special function on the at least one bingo space.

4. The apparatus of claim 1, the computer-readable memory further storing instructions that when executed by the processor direct the processor to:

initiate play of the bingo game; and receive, from a bingo game broadcaster server, a broadcast feed comprising at least one special ball call and at least one standard ball call for the bingo game.

5. The apparatus of claim 1, wherein modifying the at least one bingo space comprises:

daubing a bingo space of the bingo card, wherein the bingo space comprises a bingo number that is not associated with the first special ball.

6. The apparatus of claim 1, wherein the combined effect includes undaubing at least one daubed bingo space of the bingo card.

7. The apparatus of claim 1, wherein modifying the at least one bingo space comprises:

daubing a bingo space of the bingo card, wherein the bingo space comprises a bingo number associated with the first special ball; and daubing at least one additional bingo space of the bingo card.

8. The apparatus of claim 1, wherein the combined effect of the first special function and the second special function on the at least one bingo space comprises applying the second special function to a bingo space that is marked with a special daub.

9. The apparatus of claim 1, wherein the combined effect of the first special function and the second special function on the at least one bingo space comprises obscuring at least a portion of the bingo card for a predetermined period of time.

10. The apparatus of claim 1, wherein the bingo card comprises at least one winning bingo pattern and the bingo card is associated with a winning bingo status, and wherein applying the second special function comprises:

clearing the winning bingo status of the bingo card.

11. A method comprising:

receiving, from a user device, a call for an online gaming interface for a bingo game;

generating an online gaming interface for the user device, the online gaming interface comprising a bingo card for the bingo game;

determining a first special ball associated with a first special function;

applying the first special function to at least one bingo space of the bingo card;

determining a second special ball associated with a second special function; and after applying the first special function to the at least one bingo space, displaying an animated sequence on the online gaming interface depicting a combined effect of the first special function and the second special function on the at least one bingo space.

12. The method of claim 11, wherein the animated sequence overlays the at least one bingo space.

13. The method of claim 11, further comprising:

determining a game result for the bingo game based on the combined effect of the first special function and the second special function on the at least one bingo space.

14. The method of claim 11, further comprising:

initiating play of the bingo game; and receiving, from a bingo game broadcaster server, a broadcast feed comprising at least one special ball call and at least one standard ball call for the bingo game.

15. The method of claim 11, wherein modifying the at least one bingo space comprises:

daubing a bingo space of the bingo card, wherein the bingo space comprises a bingo number that is not associated with the first special ball.

16. The method of claim 11, wherein the combined effect includes undaubing at least one daubed bingo space of the bingo card.

17. The method of claim 11, wherein modifying the at least one bingo space comprises:

daubing a bingo space of the bingo card, wherein the bingo space comprises a bingo number associated with the first special ball; and daubing at least one additional bingo space of the bingo card.

18. The method of claim 11, wherein the combined effect of the first special function and the second special function on the at least one bingo space comprises applying the second special function to a bingo space that is marked with a special daub.

19. The method of claim 11, wherein the combined effect of the first special function and the second special function on the at least one bingo space comprises obscuring at least a portion of the bingo card for a predetermined period of time.

20. The method of claim 11, wherein the bingo card comprises at least one winning bingo pattern and the bingo card is associated with a winning bingo status, and wherein applying the second special function comprises:

clearing the winning bingo status of the bingo card.

* * * * *